(12) United States Patent
Hamazaki et al.

(10) Patent No.: US 10,232,300 B2
(45) Date of Patent: Mar. 19, 2019

(54) PLUGGED HONEYCOMB STRUCTURE

(71) Applicant: NGK INSULATORS, LTD., Nagoya (JP)

(72) Inventors: Yuichi Hamazaki, Nagoya (JP); Toshihiro Hirakawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 86 days.

(21) Appl. No.: 15/340,254

(22) Filed: Nov. 1, 2016

(65) Prior Publication Data

US 2017/0128874 A1  May 11, 2017

(30) Foreign Application Priority Data

Nov. 11, 2015 (JP) .................. 2015-221681
Oct. 11, 2016 (JP) .................. 2016-199689

(51) Int. Cl.
*B01D 46/24* (2006.01)
*B01D 53/94* (2006.01)

(52) U.S. Cl.
CPC ....... *B01D 46/2474* (2013.01); *B01D 46/247* (2013.01); *B01D 46/2459* (2013.01); *B01D 53/94* (2013.01); *B01D 53/944* (2013.01); *B01D 53/945* (2013.01); *B01D 53/9418* (2013.01); *B01D 2255/1021* (2013.01); *B01D 2255/1023* (2013.01); *B01D 2255/1025* (2013.01); *B01D 2255/2065* (2013.01); *B01D 2255/2092* (2013.01); *B01D 2255/20707* (2013.01); *B01D 2255/20715* (2013.01); *B01D 2255/20723* (2013.01); *B01D 2255/915* (2013.01); *B01D 2279/30* (2013.01)

(58) Field of Classification Search
None
See application file for complete search history.

(56) References Cited

U.S. PATENT DOCUMENTS

| 6,890,616 | B2 | 5/2005 | Suwabe et al. |
| 9,080,484 | B2 | 7/2015 | Miyairi |
| 2003/0165662 | A1 | 9/2003 | Suwabe et al. |
| 2014/0298779 | A1 | 10/2014 | Miyairi |

FOREIGN PATENT DOCUMENTS

| JP | 2003-269131 A1 | 9/2003 |
| JP | 2014-200741 A1 | 10/2014 |

*Primary Examiner* — Adam Krupicka
(74) *Attorney, Agent, or Firm* — Burr & Brown, PLLC

(57) ABSTRACT

In the plugged honeycomb structure, 30% or more of first intersection portions in which a first partition wall intersects a second partition wall are first specific intersection portions in which a diameter of a maximum inscribed circle drawn in the first intersection portion is a specific size for a shortest distance between an inflow cell and an outflow cell, and 30% or more of non-first intersection portions other than the first intersection portions are non-first specific intersection portions in which a diameter of a maximum inscribed circle drawn in a non-first intersection portion is a specific size for a shortest distance between the inflow cells or the outflow cells.

12 Claims, 11 Drawing Sheets

PLUGGED HONEYCOMB STRUCTURE

"The present application is an application based on JP2015-221681 filed on Nov. 11, 2015 and JP2016-199689 filed on Oct. 11, 2016 with Japan Patent Office, the entire contents of which are incorporated herein by reference."

BACKGROUND OF THE INVENTION

Field of the Invention

The present invention relates to a plugged honeycomb structure for a wall flow type exhaust gas filter, and more particularly, it relates to a plugged honeycomb structure suitably for use in removal of particulate matter included in an exhaust gas from an engine such as a car engine or in purification of a toxic gas of nitrogen oxides and the like.

Description of the Related Art

Internal combustion engines are used as power sources in various industries. On the other hand, an exhaust gas emitted from the internal combustion engine at a time of combustion of fuel includes particulate matter (hereinafter also referred to as "PM") such as soot or ash together with a toxic gas of nitrogen oxides and the like. In particular, regulations on removal of the PM emitted from a diesel engine have become severe worldwide, and a wall flow type gas purifying filter having a honeycomb structure is used as a diesel particulate filter which removes the PM (hereinafter also referred to as "DPF"). Further, as the wall flow type gas purifying filter, there is used a plugged honeycomb structure including a honeycomb structure body in which porous partition walls define a plurality of cells forming through channels for fluid, and plugging portions each of which is disposed in one of open ends of each cell.

The plugged honeycomb structure has a structure in which the porous partition walls constituting the honeycomb structure body perform a function of the PM removing filter. Specifically, in the plugged honeycomb structure, the exhaust gas containing the PM flows into an inflow side end face of the structure, the porous partition walls trap and filter the PM, and then the purified exhaust gas is emitted from an outflow side end face, whereby the plugged honeycomb structure has been used as the DPF.

Heretofore, as this plugged honeycomb structure, a structure has been suggested in which reinforcing portions constituted of R-parts or the like are selectively disposed in corners of the cells defined by the partition walls. For example, a honeycomb structure has been suggested in which substantially circular R-parts are disposed in all intersection portions of the partition walls which have become thin, so that it is possible to prevent generation of cracks (Patent Document 1). Additionally, it has been suggested that substantially circular R-parts are disposed in corners of each cell which face each other, thereby preventing generation of cracks in intersection portions of partition walls (Patent Document 2). The reinforcing portions constituted of the R-parts or the like are basically arranged in all the corners of the cells formed in the plugged honeycomb structure, and additionally, the reinforcing portions have been arranged selectively in the cells formed in a circumferential portion of the honeycomb structure, or the reinforcing portions have been arranged to become larger toward a circumference of the structure.

[Patent Document 1] JP-A-2014-200741
[Patent Document 2] JP-A-2003-269131

SUMMARY OF THE INVENTION

Arranging of reinforcing portions in corners of cells formed in a plugged honeycomb structure as in a conventional technology is effective for improvement of a mechanical strength, e.g., an isostatic strength of the plugged honeycomb structure. Consequently, the reinforcing portions are arranged in the corners of the cells, thereby making it possible to effectively inhibit breaking or the like of the plugged honeycomb structure, for example, when the plugged honeycomb structure is canned into a canning container. However, when the number of the corners in which the reinforcing portions are arranged is excessively large, there has been the problem that an open area of an inflow side end face of the plugged honeycomb structure decreases and that a pressure loss of the plugged honeycomb structure increases. Furthermore, when the number of the corners in which the reinforcing portions are arranged is excessively large, there has been the problem that a volume of the inflow cells opened in the inflow side end face of the plugged honeycomb structure decreases and that a storing capacity to deposit ash in the plugged honeycomb structure decreases.

Furthermore, in a case of using the plugged honeycomb structure as a DPF, a regeneration treatment is performed to burn and remove PM deposited on partition walls. During this regeneration treatment, cracks might be generated in the plugged honeycomb structure due to thermal stress caused by burning the PM. When the cracks are generated in the plugged honeycomb structure, a trapping efficiency of the PM deteriorates. Many of the cracks generated in the plugged honeycomb structure noticeably grow along the cells while passing the corners of the other cells defined by the partition walls. Consequently, when the reinforcing portions are arranged in the corners of the cells, it is possible to heighten a resistance to the stress which generates the cracks. However, under actual circumstances, it is not possible to completely control the stress generated in the plugged honeycomb structure due to various operation conditions of a car engine or the like, or conditions of properties of the PM included in an exhaust gas and the like. Consequently, in a case of generating unexpectedly large stress in the plugged honeycomb structure, it is not possible to avoid the generation of the cracks, and in the case of using the conventional plugged honeycomb structure as the DPF, the structure has to be designed in consideration of safety so that the cracks are not generated. That is, in the case of using the conventional plugged honeycomb structure as the DPF, a tolerable amount of depositable soot might be set to be lower than an original tolerable amount thereof during the use.

The present invention has been developed in view of such problems of the conventional technologies. According to the present invention, there is provided a plugged honeycomb structure which is capable of effectively inhibiting each of decrease of an open area, increase of a pressure loss and deterioration of a PM trapping efficiency and is excellent in mechanical strength and thermal shock resistance.

According to the present invention, there is provided a plugged honeycomb structure as follows.

According to the first aspect of the present invention, a plugged honeycomb structure including a honeycomb structure body is provided having porous partition walls defining a plurality of cells which extend from an inflow side end face to an outflow side end face and become through channels for fluid; and plugging portions arranged in open ends of the respective cells in the inflow side end face or the outflow side end face, wherein the plurality of cells include inflow cells in which the plugging portions are arranged at the open ends of the cells in the outflow side end face, and outflow cells in which the plugging portions are arranged at the open ends of the cells in the inflow side end face, the partition wall defining the inflow cell and the outflow cell is classified as a first partition wall, the partition wall defining the inflow cells or the outflow cells from each other is classified as a second partition wall, and in a cross section of the honeycomb structure body which is perpendicular to an extending direction of the cells, an intersection portion in which at least one of the first partition walls intersects at least one of the second partition walls is classified as a first intersection portion and an intersection portion in which the first partition walls or the second partition walls intersect each other is classified as a non-first intersection portion, and among the first intersection portions, there is specified, as a first specific intersection portion, the first intersection portion in which a diameter D1 of a maximum inscribed circle including a part of the first intersection portion and coming in contact with the inflow cell and the outflow cell in a portion in which three partition walls intersect is 1.15 times or more and 1.80 times or less as much as a shortest distance L1 between the inflow cell and the outflow cell in the first intersection portion, and there is specified, as the first specific intersection portion, the first intersection portion in which the diameter D1 of the maximum inscribed circle including a part of the first intersection portion and coming in contact with the inflow cell and the outflow cell in a portion where four partition walls intersect is 1.50 times or more and 2.10 times or less as much as the shortest distance L1 between the inflow cell and the outflow cell in the first intersection portion, and among all the first intersection portions of the honeycomb structure body, the first intersection portions at a number percentage of 30% or more are the first specific intersection portions, and among the non-first intersection portions, there is specified, as a non-first specific intersection portion, the non-first intersection portion in which a diameter D0 of the maximum inscribed circle including a part of the non-first intersection portion and coming in contact with the inflow cells or the outflow cells in a portion where three partition walls intersect is smaller than 1.20 times as much as a shortest distance L0 between the inflow cells or the outflow cells in the non-first intersection portion, and among the non-first intersection portions in portions where four partition walls intersect, there is specified, as the non-first specific intersection portion, the non-first intersection portion in which the diameter D0 of the maximum inscribed circle including a part of the non-first intersection portion and coming in contact with the inflow cells or the outflow cells is smaller than 1.55 times as much as the shortest distance L0 between the inflow cells or the outflow cells in the non-first intersection portion, and among all the non-first intersection portions of the honeycomb structure body, the non-first intersection portions at a number percentage of 30% or more are the non-first specific intersection portions.

According to a second aspect of the present invention, the plugged honeycomb structure according to the above first aspect is provided, wherein among all the first intersection portions of the honeycomb structure body, the first intersection portions at a number percentage of 50% or more are the first specific intersection portions.

According to a third aspect of the present invention, the plugged honeycomb structure according to the above second aspect is provided, wherein all the first intersection portions of the honeycomb structure body are the first specific intersection portions.

According to a fourth aspect of the present invention, the plugged honeycomb structure according to any one of the above first to third aspects is provided, wherein all the non-first intersection portions of the honeycomb structure body are the non-first specific intersection portions.

According to a fifth aspect of the present invention, the plugged honeycomb structure according to any one of the above first to fourth aspects is provided, wherein the percentage of the number of the first intersection portions to the total number of the first intersection portions and the non-first intersection portions of the honeycomb structure body is from 20 to 98%.

According to a sixth aspect of the present invention, the plugged honeycomb structure according to the above second or third aspects is provided, wherein among the first intersection portions, the intersection portion in which the first partition wall intersects the second partition wall at an angle of $90°\pm25°$ is classified as a second intersection portion, and among the second intersection portions, there is specified, as a second specific intersection portion, the second intersection portion in which a diameter D2 of a maximum inscribed circle including a part of the second intersection portion and coming in contact with the inflow cell and the outflow cell is 1.15 times or more and 1.80 times or less as much as a shortest distance L2 between the inflow cell and the outflow cell in the second intersection portion, and among all the first intersection portions of the honeycomb structure body, the first intersection portions at a number percentage of 30% or more are the second specific intersection portions.

According to a seventh aspect of the present invention, the plugged honeycomb structure according to the above sixth aspect is provided, wherein all the second intersection portions of the honeycomb structure body are the second specific intersection portions.

According to an eighth aspect of the present invention, the plugged honeycomb structure according to the above seventh aspect is provided, wherein among all the first intersection portions of the honeycomb structure body, the first intersection portions other than the second intersection portions are not the first specific intersection portions.

According to a ninth aspect of the present invention, the plugged honeycomb structure according to any one of the above first to eighth aspects is provided, wherein a thickness of the partition walls is from 70 to 510 μm.

According to a tenth aspect of the present invention, the plugged honeycomb structure according to any one of the above first to ninth aspects is provided, wherein the partition walls are made of a material including at least one selected from the group consisting of cordierite, mullite, alumina, spinel, silicon carbide, silicon nitride, and aluminum titanate.

According to an eleventh aspect of the present invention, the plugged honeycomb structure according to any one of the above first to tenth aspects is provided, wherein in the cross section of the honeycomb structure body which is perpendicular to the cell extending direction, a shape of at least one of the inflow cells is a pentangular shape or a hexagonal shape in which at least one corner is formed into a curve shape or at least one corner is linearly chamfered.

According to a twelfth aspect of the present invention, the plugged honeycomb structure according to any one of the above first to eleventh aspects is provided, wherein in the cross section of the honeycomb structure body which is perpendicular to the cell extending direction, a shape of at least one of the outflow cells is a quadrangular shape in which at least one corner is formed into a curve shape or at least one corner is linearly chamfered.

The plugged honeycomb structure of the present invention produces the effect that the plugged honeycomb structure is capable of effectively inhibiting each of decrease of an open area, increase of a pressure loss, and deterioration of a trapping efficiency of PM and is excellent in mechanical strength and thermal shock resistance. Especially, in the plugged honeycomb structure of the present invention, even when cracks are generated in intersection portions, it is possible to effectively inhibit the cracks from growing and to effectively inhibit soot leakage from the plugged honeycomb structure.

More specifically, in the plugged honeycomb structure of the present invention, 30% (number %) or more of all first intersection portions are first specific intersection portions, and 30% (number %) or more of all non-first intersection portions are non-first specific intersection portions, so that it is possible to effectively inhibit the decrease of the open area and the increase of the pressure loss. Furthermore, the first intersection portions are regions directly connected to the deterioration of the PM trapping efficiency on the occurrence of the cracks in the plugged honeycomb structure. Here, the first specific intersection portions are the first intersection portions constituted to relatively increase a space between an inflow cell and an outflow cell, and such first specific intersection portions are disposed as much as 30% or more, so that it is possible to effectively inhibit the deterioration of the PM trapping efficiency. On the other hand, a non-first intersection portion is a region which has very little influence on the deterioration of the PM trapping efficiency. Consequently, 30% or more of the non-first intersection portions are classified as non-first specific intersection portions, whereby as to the non-first intersection portions, there is employed a constitution which contributes to the inhibition of the decrease of the open area and the inhibition of the increase of the pressure loss more noticeably than to a crack generation inhibiting effect. Therefore, the plugged honeycomb structure of the present invention produces the effect that the plugged honeycomb structure is capable of effectively inhibiting each of the decrease of the open area, the increase of the pressure loss, and the deterioration of the PM trapping efficiency and is excellent in mechanical strength and thermal shock resistance.

DESCRIPTION OF THE PREFERRED EMBODIMENTS

Hereinafter, embodiments of the present invention will be described. However, the present invention is not limited to the following embodiments. Therefore, it should be understood that changes, improvements and the like can suitably be added to the following embodiments on the basis of usual knowledge of a person skilled in the art without departing from the gist of the present invention.

Figure 1:
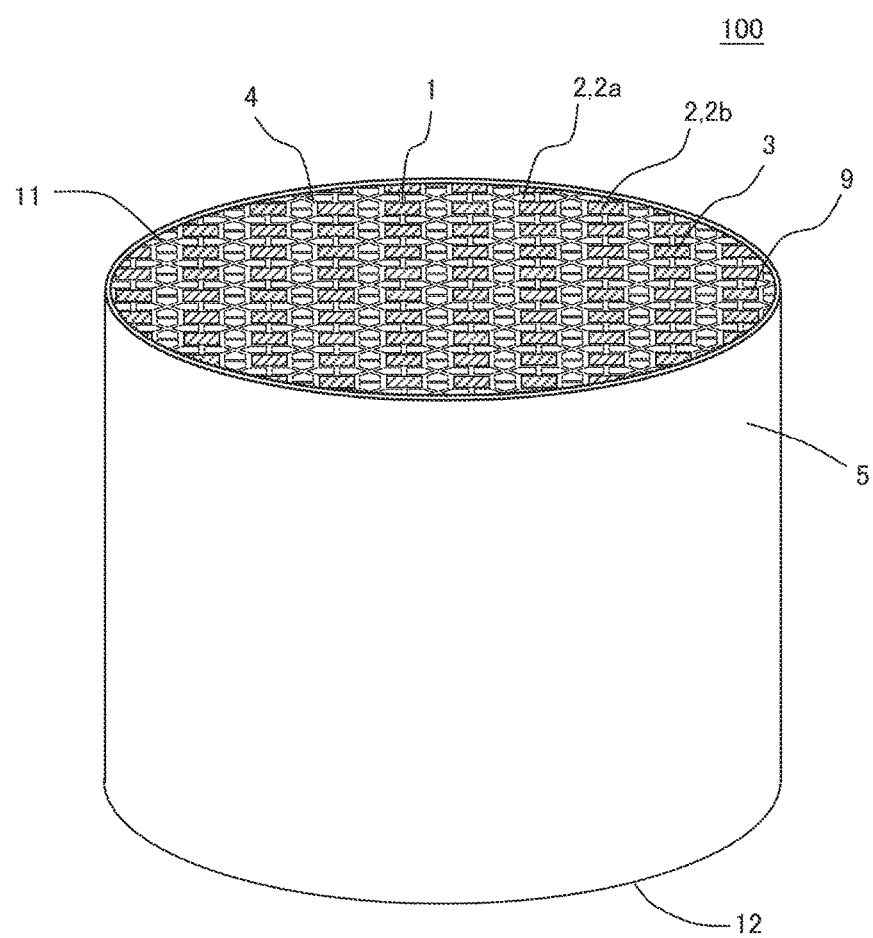
FIG. 1 is a perspective view schematically showing one embodiment of a plugged honeycomb structure of the present invention.
Figure 2:
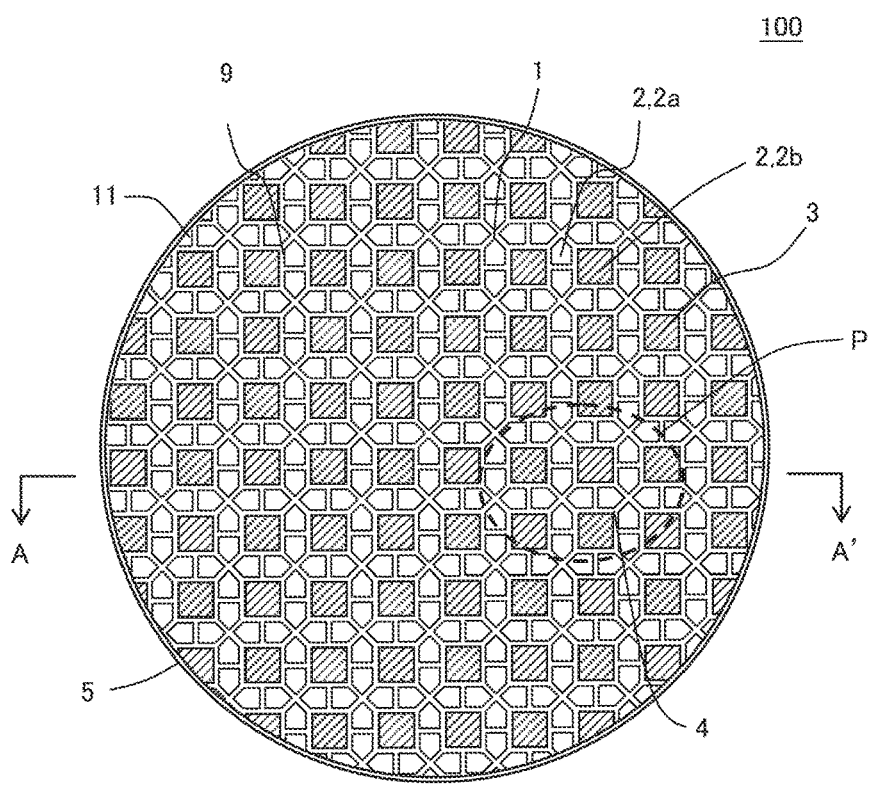
FIG. 2 is a plan view schematically showing an inflow side end face of the plugged honeycomb structure shown in FIG. 1.
Figure 3:
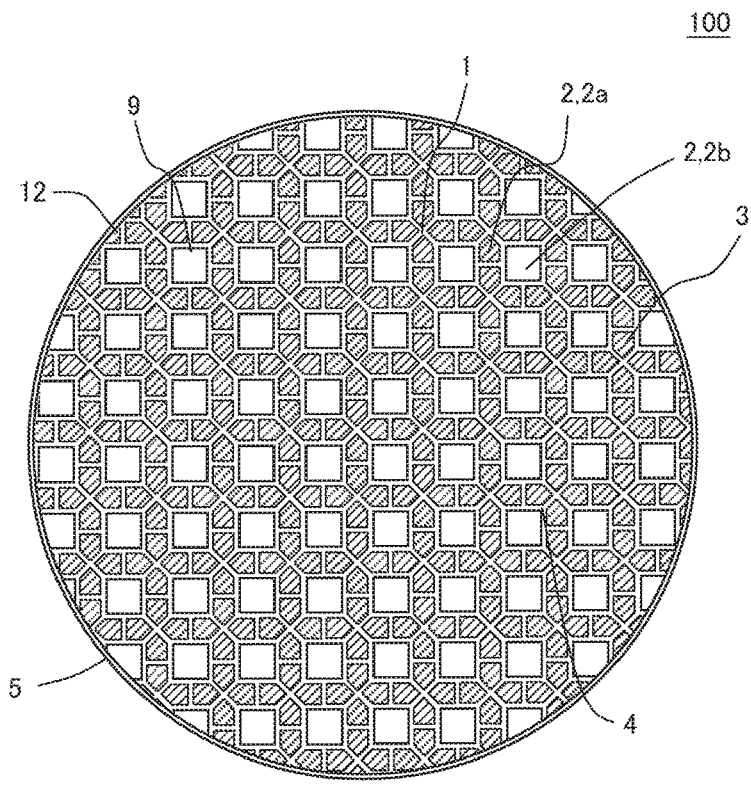
FIG. 3 is a plan view schematically showing an outflow side end face of the plugged honeycomb structure shown in FIG. 1.
Figure 4:
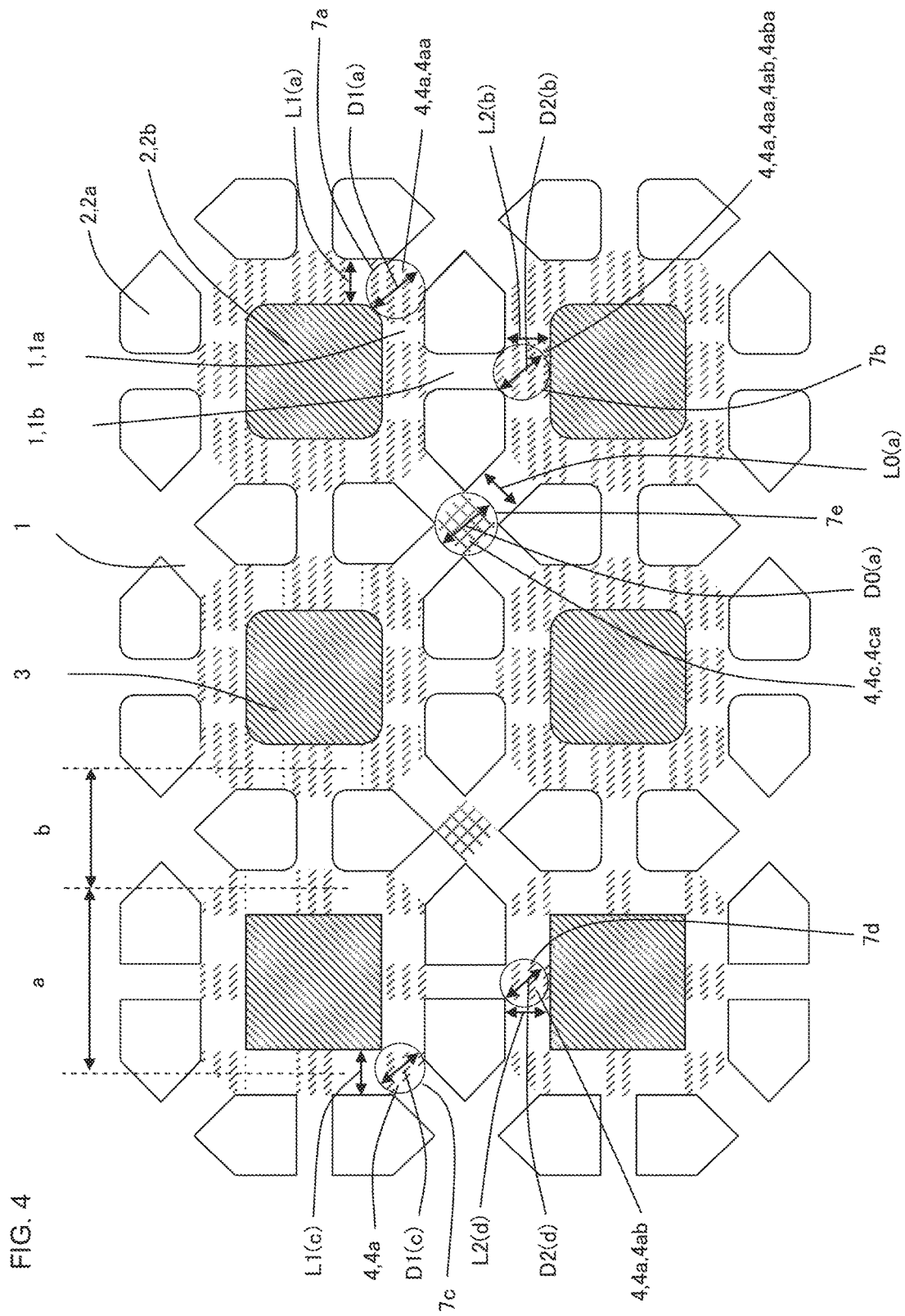
FIG. 4 is an enlarged schematic view showing an enlarged range shown by a sign P of FIG. 2 and surrounded with a broken line.
Figure 5:
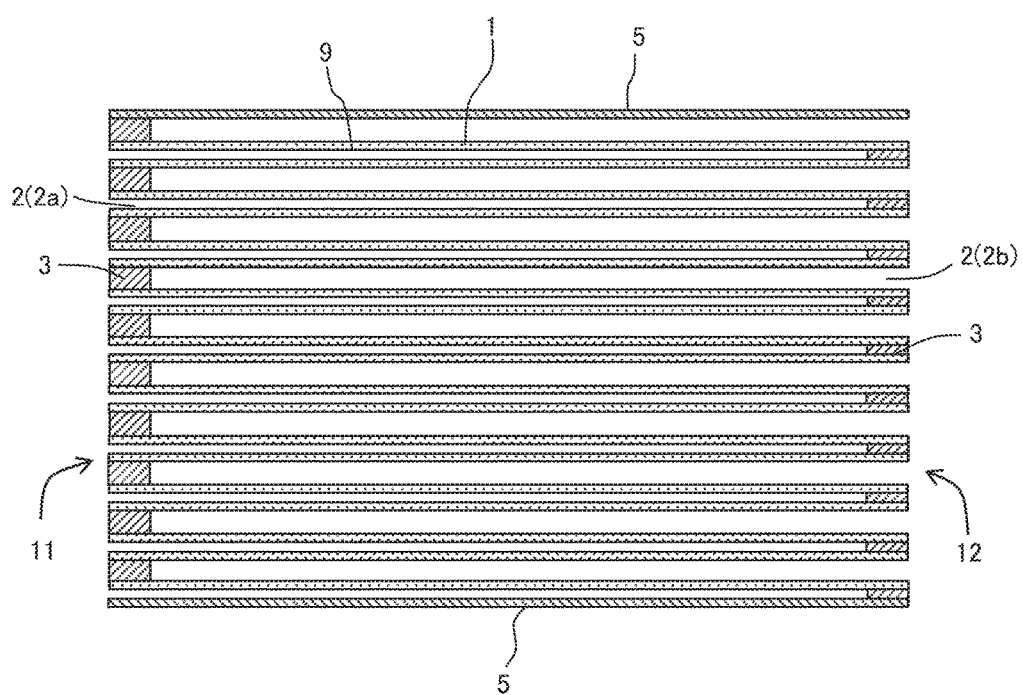
FIG. 5 is a cross-sectional view schematically showing a cross section taken along the line A-A' of FIG. 2.

(1) Plugged Honeycomb Structure:

As shown in FIG. 1 to FIG. 5, a first embodiment of a plugged honeycomb structure of the present invention is a plugged honeycomb structure 100 including a honeycomb structure body 9 and plugging portions 3. Here, FIG. 1 is a perspective view schematically showing one embodiment of the plugged honeycomb structure of the present invention. FIG. 2 is a plan view schematically showing an inflow side end face of the plugged honeycomb structure shown in FIG. 1. FIG. 3 is a plan view schematically showing an outflow side end face of the plugged honeycomb structure shown in FIG. 1. FIG. 4 is an enlarged schematic view showing an enlarged range shown by a sign P of FIG. 2 and surrounded with a broken line. FIG. 5 is a cross-sectional view schematically showing a cross section taken along the line A-A' of FIG. 2.

The honeycomb structure body 9 has porous partition walls 1 defining a plurality of cells 2 which extend from an inflow side end face 11 to an outflow side end face 12 and become through channels for fluid. The honeycomb structure body 9 shown in FIG. 1 to FIG. 3 and FIG. 5 has a circumferential wall 5 disposed to surround the partition walls 1 defining the cells 2.

The plugging portion 3 is disposed at an open end of each cell 2 in the inflow side end face 11 or the outflow side end face 12, and plugs one of the open ends of the cell 2. The plugged honeycomb structure 100 including the plugging portions 3 is usable as, for example, a wall flow type gas purifying filter.

The plurality of cells 2 include inflow cells 2a in which the plugging portions 3 are arranged at the open ends of the cells 2 in the outflow side end face 12, and outflow cells 2b in which the plugging portions 3 are arranged at the open ends of the cells 2 in the inflow side end face 11. When the plugged honeycomb structure 100 is used as the wall flow type gas purifying filter, the plugged honeycomb structure 100 is disposed so that the inflow side end face 11 is positioned on an upstream side of an exhaust system which emits an exhaust gas, and the exhaust gas flows into the inflow cells 2a from the inflow side end face 11. Further, the exhaust gas flowing into the inflow cells 2a passes the porous partition walls 1 to flow into the outflow cells 2b, and is emitted from the outflow side end face 12 of the plugged honeycomb structure 100. When passing the porous partition walls 1, PM and the like included in the exhaust gas are trapped, and the trapped PM is deposited on the surfaces of the partition walls 1 or in pores of the partition walls 1.

In the plugged honeycomb structure 100 of the present embodiment, the partition walls 1 defining the cells 2 are classified into first partition walls 1a and second partition walls 1b as follows. The first partition wall 1a is the partition wall 1 defining the inflow cell 2a and the outflow cell 2b. The second partition wall 1b is the partition wall 1 defining the inflow cells 2a or the outflow cells 2b from each other. Here, "the partition wall 1 defining the inflow cells 2a from each other" is the partition wall 1 in which when the inflow cell 2a is present on one surface side of the partition wall 1, the inflow cell 2a is also present on another surface side of the partition wall 1. Furthermore, "the partition wall 1 defining the outflow cells 2b from each other" is the partition wall 1 in which when the outflow cell 2b is present on one surface side of the partition wall 1, the outflow cell 2b is also present on another surface side of the partition wall 1. Furthermore, "the partition wall 1 defining the inflow cell 2a and the outflow cell 2b" is the partition wall 1 in which when the inflow cell 2a is present on one surface side of the partition wall 1, the outflow cell 2b is present on another surface side of the partition wall 1. It is to be noted that for the first partition wall 1a and the second partition wall 1b, the partition walls 1 are conveniently classified in accordance with types of cells 2 to be defined by the partition walls 1, and the first partition wall 1a and the second partition wall 1b are monolithic constituent elements which are continuous with each other.

In the plugged honeycomb structure 100 of the present embodiment, intersection portions in which the partition walls 1 intersect one another are classified into a first intersection portion 4a and a non-first intersection portion 4c as follows. The first intersection portion 4a is at least an intersection portion in which at least one first partition wall 1a intersects at least one second partition wall 1b in a cross section of the honeycomb structure body 9 which is perpendicular to an extending direction of the cells 2. That is, in the first intersection portion 4a, the partition walls 1 extending on the basis of the first intersection portion 4a include the partition walls 1 of both the first partition wall 1a and the second partition wall 1b. The non-first intersection portion 4c is an intersection portion in which the first partition walls 1a or the second partition walls 1b intersect each other in the cross section of the honeycomb structure body 9 which is perpendicular to the extending direction of the cells 2.

Furthermore, in the plugged honeycomb structure 100 of the present embodiment, among the first intersection portions 4a, the first intersection portion 4a constituted as follows is specified as a first specific intersection portion 4aa. First, to judge whether or not the first intersection portion 4a is the first specific intersection portion 4aa, a maximum inscribed circle including a part of the first intersection portion 4a and coming in contact with the inflow cell 2a and the outflow cell 2b is virtually drawn to each first intersection portion 4a, and a diameter D1 of the maximum inscribed circle is obtained. In this case, it is necessary to constitute the first intersection portion 4a as follows so that the first intersection portion 4a is the first specific intersection portion 4aa in a case where the first intersection portion 4a is a portion in which three partition walls 1 intersect. That is, to specify the first intersection portion 4a in which the three partition walls 1 intersect as the first specific intersection portion 4aa, it is necessary that the diameter D1 of the maximum inscribed circle is 1.15 times or more and 1.80 times or less as much as the shortest distance L1 between the inflow cell 2a and the outflow cell 2b in the first intersection portion 4a. Furthermore, it is necessary to constitute the first intersection portion 4a as follows so that the first intersection portion 4a is the first specific intersection portion 4aa in a case where the first intersection portion 4a is a portion in which four partition walls 1 intersect. That is, to specify the first intersection portion 4a in which the four partition walls 1 intersect as the first specific intersection portion 4aa, it is necessary that the diameter D1 of the maximum inscribed circle is 1.50 times or more and 2.10 times or less as much as the shortest distance L1 between the inflow cell 2a and the outflow cell 2b in the first intersection portion 4a. The respective first intersection portions 4a constituted as described above are specified as the first specific intersection portions 4aa. Hereinafter, the maximum inscribed circle including a part of the first intersection portion 4a and coming in contact with the inflow cell 2a and the outflow cell 2b will also be referred to as "the maximum inscribed circle drawn in the first intersection portion 4a".

It is possible to obtain the diameter D1 of the above-mentioned maximum inscribed circle by a known method such as image analysis. For example, FIG. 4 shows a state of virtually drawing maximum inscribed circles 7a, 7b, 7c and 7d each including a part of the first intersection portion 4a and coming in contact with the inflow cell 2a and the outflow cell 2b. Furthermore, FIG. 4 shows the diameter D1 of each of the maximum inscribed circles 7a, 7b, 7c and 7d by each of arrows denoted with signs D1(a), D2(b), D1(c) and D2(d). Furthermore, FIG. 4 shows the shortest distance L1 between the inflow cell 2a and the outflow cell 2b in the first intersection portion 4a by each of arrows denoted with signs L1 (a), L2(b), L1(c) and L2(d). On the right side of a paper surface of FIG. 4, the first intersection portions 4a in which the maximum inscribed circles 7a and 7b are drawn are the first specific intersection portions 4aa. Furthermore, on the left side of the paper surface of FIG. 4, the first intersection portions 4a in which the maximum inscribed circles 7c and 7d are drawn are not the first specific intersection portions 4aa.

In the plugged honeycomb structure 100 of the present embodiment, among all the first intersection portions 4a of the honeycomb structure body 9, the first intersection portions 4a at a number percentage of 30% or more are the first specific intersection portions 4aa. Hereinafter, unless otherwise specified, a percentage of the first specific intersection portions 4aa occupied in the first intersection portions 4a is a number percentage (number %). For example, when "among all the first intersection portions 4a, the first intersection portions 4a at a number percentage of 30% or more are the first specific intersection portions 4aa", it is also described that "30% or more of the first intersection portions 4a are the first specific intersection portions 4aa". Additionally, in the plugged honeycomb structure, in a case where "the first intersection portion in which five or more partition walls intersect" is present, the first intersection portion is simply referred to as "the first intersection portion". That is, "the first intersection portion in which five or more partition walls intersect" is not counted as the first specific intersection portion. Further, in the plugged honeycomb structure of the present embodiment, to the number of all "the first intersection portions", "the first specific intersection portions among the first intersection portions in which three or four partition walls intersect" satisfy "30% or more".

Furthermore, in the plugged honeycomb structure 100 of the present embodiment, among the non-first intersection portions 4c, the non-first intersection portion 4c constituted as follows is specified as a non-first specific intersection portion 4ca. First, to judge whether or not the intersection portion is the non-first specific intersection portion 4ca, to each non-first intersection portion 4c, a maximum inscribed circle including a part of the non-first intersection portion 4c and coming in contact with the inflow cells 2a or the outflow cells 2b is virtually drawn, and a diameter D0 of the maximum inscribed circle is obtained. In this case, in a case where the non-first intersection portion 4c is the portion in which the three partition walls 1 intersect, it is necessary to constitute the non-first intersection portion 4c as the non-first specific intersection portion 4ca as follows. That is, to specify the non-first intersection portion 4c in which the three partition walls 1 intersect as the non-first specific intersection portion 4ca, it is necessary that the diameter D0 of the maximum inscribed circle is smaller than 1.20 times as much as a shortest distance L0 between the inflow cells 2a or the outflow cells 2b in the non-first intersection portion 4c. Furthermore, in a case where the non-first intersection portion 4c is the portion in which the four partition walls 1 intersect, it is necessary to constitute the non-first intersection portion 4c as the non-first specific intersection portion 4ca as follows. That is, to specify the non-first intersection portion 4c in which the four partition walls 1 intersect as the non-first specific intersection portion 4ca, it is necessary that the diameter D0 of the maximum inscribed circle is smaller than 1.55 times as much as the shortest distance L0 between the inflow cells 2a or the outflow cells 2b in the non-first intersection portion 4c. The respective non-first intersection portions 4c constituted as described above are specified as the non-first specific intersection portions 4ca. Hereinafter, the maximum inscribed circle including a part of the non-first intersection portion 4c and coming in contact with the inflow cells 2a or the outflow cells 2b will also be referred to as "the maximum inscribed circle drawn in the non-first intersection portion 4c".

The diameter D0 of the maximum inscribed circle can be obtained also by a known method such as the image analysis. For example, FIG. 4 shows a state of virtually drawing a maximum inscribed circle 7e including a part of the non-first intersection portion 4c and coming in contact with the inflow cells 2a. Further, FIG. 4 shows the diameter D0 of the maximum inscribed circle 7e by an arrow denoted with a sign D0(a). Furthermore, FIG. 4 shows the shortest distance L0 between the inflow cells 2a in the non-first intersection portion 4c by an arrow denoted with a sign L0(a).

In the plugged honeycomb structure 100 of the present embodiment, among all the non-first intersection portions 4c of the honeycomb structure body 9, the non-first intersection portions 4c at a number percentage of 30% or more are the non-first specific intersection portions 4ca. Hereinafter, unless otherwise specified, a percentage of the non-first specific intersection portions 4ca occupied in the non-first intersection portions 4c is a number percentage (number %). For example, when "among all the non-first intersection portions 4c, the non-first intersection portions 4c at a number percentage of 30% or more are the non-first specific intersection portions 4ca", it is also described that "30% or more of the non-first intersection portions 4c are the non-first specific intersection portions 4ca".

The plugged honeycomb structure of the present embodiment constituted as described above produces the effect that the plugged honeycomb structure is capable of effectively inhibiting each of decrease of an open area, increase of a pressure loss, and deterioration of a trapping efficiency of PM and is excellent in mechanical strength and thermal shock resistance. Especially, in the plugged honeycomb structure of the present embodiment, even when cracks are generated in the intersection portions, it is possible to effectively inhibit the cracks from growing and to effectively inhibit soot leakage from the plugged honeycomb structure. More specifically, in the plugged honeycomb structure of the present embodiment, 30% or more of all the first intersection portions are the first specific intersection portions, and 30% or more of all the non-first intersection portions are the non-first specific intersection portions. Consequently, in the plugged honeycomb structure of the present embodiment, it is possible to effectively inhibit the decrease of the open area and the increase of the pressure loss. The first intersection portions are regions directly connected to the deterioration of the PM trapping efficiency in a case of generating the cracks in the plugged honeycomb structure. Here, the first specific intersection portion is the first intersection portion constituted to relatively increase a space between the inflow cell and the outflow cell. When such first specific intersection portions are disposed as much as 30% or more, it is possible to increase strength to thermal stress during PM regeneration, and even when the cracks are generated in the plugged honeycomb structure, it is possible to prevent the cracks from growing in the first specific intersection portions and to effectively inhibit the deterioration of the PM trapping efficiency. On the other hand, the non-first intersection portion is a region which has very little influence on the deterioration of the PM trapping efficiency. Consequently, 30% or more of the non-first intersection portions are specified as the non-first specific intersection portions, whereby as to the non-first intersection portions, there is employed a constitution which contributes to the inhibition of the decrease of the open area and the inhibition of the increase of the pressure loss more noticeably than to a crack generation inhibiting effect. Therefore, the plugged honeycomb structure of the present embodiment produces the effect that the plugged honeycomb structure is capable of effectively inhibiting each of the decrease of the open area, the increase of the pressure loss, and the deterioration of the PM trapping efficiency and is excellent in mechanical strength and thermal shock resistance.

The diameter D1 of the maximum inscribed circle drawn in the first intersection portion 4a in which the three partition walls 1 intersect is smaller than 1.15 times as much as the shortest distance L1 between the inflow cell 2a and the outflow cell 2b in the first intersection portion 4a, the generation inhibiting effect of the cracks in the first intersection portion 4a might not sufficiently develop. Similarly, when the diameter D1 of the maximum inscribed circle drawn in the first intersection portion 4*a* in which the four partition walls 1 intersect is smaller than 1.50 times as much as the shortest distance L1 between the inflow cell 2*a* and the outflow cell 2*b* in the first intersection portion 4*a*, the generation inhibiting effect of the cracks in the first intersection portion 4*a* might not sufficiently develop. Furthermore, when the diameter D1 of the maximum inscribed circle drawn in the first intersection portion 4*a* in which the three partition walls 1 intersect is in excess of 1.80 times as much as the above shortest distance L1, the first intersection portion 4*a* excessively thickens, and hence the open area of the cells 2 might decrease or the pressure loss might increase. Similarly, when the diameter D1 of the maximum inscribed circle drawn in the first intersection portion 4*a* in which the four partition walls 1 intersect is in excess of 2.10 times as much as the above shortest distance L1, the first intersection portion 4*a* excessively thickens, and hence the open area of the cells 2 might decrease or the pressure loss might increase.

When the number of the first specific intersection portions 4*aa* is smaller than 30% to the number of all the first intersection portions 4*a* of the honeycomb structure body 9, the number of the first specific intersection portion 4*aa* is excessively small, and hence the generation inhibiting effect of the cracks in the first intersection portions 4*a* might not sufficiently develop.

When the diameter D0 of the maximum inscribed circle drawn in the non-first intersection portion 4*c* in which the three partition walls 1 intersect is in excess of 1.20 times as much as the shortest distance L0, in the non-first intersection portion 4*c* which only has little influence on the deterioration of the PM trapping efficiency, the generation inhibiting effect of the cracks might excessively develop. Similarly, when the diameter D0 of the maximum inscribed circle drawn in the non-first intersection portion 4*c* in which the four partition walls 1 intersect is in excess of 1.55 times as much as the shortest distance L0, in the non-first intersection portion 4*c* which only has little influence on the deterioration of the PM trapping efficiency, the generation inhibiting effect of the cracks might excessively develop. Consequently, as a result, due to the presence of the non-first intersection portion 4*c*, the bad influences including decrease of the open area of the cells 2 and increase of pressure loss are larger than the deterioration inhibiting effect of the PM trapping efficiency. Especially, when the percentage of the non-first intersection portions 4*c* other than the non-first specific intersection portions 4*ca* is in excess of 70% of all the non-first intersection portions 4*c* of the honeycomb structure body 9, there increase remarkably the bad influences that the open area of the cells 2 decreases and that the pressure loss increases. Here, the non-first intersection portions 4*c* other than the non-first specific intersection portions 4*ca* are two types of non-first intersection portions 4*c* constituted as follows. A first type of non-first intersection portion 4*c* is the non-first intersection portion 4*c* in which the diameter D0 of the maximum inscribed circle is in excess of 1.20 times as much as the shortest distance L0 among the non-first intersection portions 4*c* in which the three partition walls 1 intersect. A second type of non-first intersection portion 4*c* is the non-first intersection portion 4*c* in which the diameter D0 of the maximum inscribed circle is in excess of 1.55 times as much as the shortest distance L0 among the non-first intersection portions 4*c* in which the four partition walls 1 intersect.

In the plugged honeycomb structure of the present embodiment, it is preferable that 50% or more of all the first intersection portions of the honeycomb structure body are the first specific intersection portions. Furthermore, it is especially preferable that all the first intersection portions of the honeycomb structure body are the first specific intersection portions. According to this constitution, it is possible to remarkably effectively inhibit the deterioration of the PM trapping efficiency.

In the plugged honeycomb structure of the present embodiment, it is preferable that all the non-first intersection portions of the honeycomb structure body are the non-first specific intersection portions. According to this constitution, it is possible to remarkably effectively inhibit the decrease of the open area and the increase of the pressure loss.

It is to be noted that in the plugged honeycomb structure of the present embodiment, there is not any special restriction on a ratio between the first intersection portions and the non-first intersection portions which are present in the honeycomb structure body. For example, to the total number of the first intersection portions and the non-first intersection portions of the honeycomb structure body, the number percentage of the first intersection portions is preferably from 20 to 98% and more preferably from 50 to 98%. Such a constitution produces an effect of decrease of the pressure loss.

Furthermore, as shown in FIG. 4, among the first intersection portions 4*a*, it is more preferable that second specific intersection portions 4*aba* constituted as follows has a number percentage of 30% or more among all the first intersection portions 4*a* of the honeycomb structure body 9. First, to judge whether or not the first intersection portion 4*a* is the second specific intersection portion 4*aba*, the first intersection portion 4*a* satisfying the following conditions is classified as a second intersection portion 4*ab*. The second intersection portion 4*ab* is an intersection portion 4 in which the first partition wall 1*a* intersects the second partition wall 1*b* at an angle of 90°±25° in the cross section of the honeycomb structure body which is perpendicular to the cell extending direction. Further, among the second intersection portions 4*ab*, the second intersection portion 4*ab* constituted as follows is specified as the second specific intersection portion 4*aba*. First, to judge whether or not the intersection portion is the second specific intersection portion 4*aba*, to each second intersection portion 4*ab*, a maximum inscribed circle including a part of the second intersection portion 4*ab* and coming in contact with the inflow cells 2*a* and the outflow cell 2*b* is virtually drawn, and a diameter D2 of the maximum inscribed circle is obtained. Further, to specify the second intersection portion 4*ab* as the second specific intersection portion 4*aba*, it is necessary that the diameter D2 of the maximum inscribed circle is 1.15 times or more and 1.80 times or less as much as a shortest distance L2 between the inflow cell and the outflow cell in the second intersection portion 4*ab*. The second intersection portion 4*ab* constituted in this manner is specified as the second specific intersection portion 4*aba*. Here, a judging method of the second specific intersection portion 4*aba* is similar to the above-mentioned judging method of the first specific intersection portion 4*aa* except that the intersection portion 4 of a judgment target is a further specified second intersection portion 4*ab* among the first intersection portions 4*a*. Hereinafter, the maximum inscribed circle including a part of the second intersection portion 4*ab* and coming in contact with the inflow cell 2*a* and the outflow cell 2*b* will also be referred to as "the maximum inscribed circle drawn in the second intersection portion 4*ab*". Furthermore, unless otherwise specified, a percentage of the second specific intersection portions 4*aba* occupied in the first intersection portions 4*a* is a number percentage (number %).

Here, the second intersection portion 4*ab* is the intersection portion 4 in which the first partition wall 1*a* intersects the second partition wall 1*b* at the angle of 90°±25°, and the specific number of the intersection portions 4 among the second intersection portions 4*ab* are specified as the second specific intersection portions 4*aba*, so that it is possible to effectively inhibit the deterioration of the PM trapping efficiency. It is to be noted that the second intersection portion 4*ab* is the intersection portion 4 in which the first partition wall 1*a* intersects the second partition wall 1*b* only at the angle of 90°±25°. For example, even when one first partition wall 1*a* intersects one second partition wall 1*b* at the angle of 90°±25°, the intersection portion 4 is not classified as the second intersection portion 4*ab* in a case where one first partition wall 1*a* intersects another second partition wall 1*b* at an angle other than the angle of 90°±25°.

In the plugged honeycomb structure of the present embodiment, it is more preferable that all the second intersection portions of the honeycomb structure body are the second specific intersection portions. The second intersection portion is a remarkably effective region in the inhibiting effect of the deterioration of the PM trapping efficiency, and the second intersection portion is preferentially classified as the second specific intersection portion, so that it is possible to remarkably suitably develop the inhibiting effect of the deterioration of the PM trapping efficiency.

In the plugged honeycomb structure of the present embodiment, it is preferable that among all the first intersection portions of the honeycomb structure body, the first intersection portions other than the second intersection portions are not the first specific intersection portions. The second intersection portion is a remarkably effective region in the inhibiting effect of the deterioration of the PM trapping efficiency, and the second intersection portion is preferentially specified as the second specific intersection portion, so that it is possible to suitably keep balance between the inhibiting effect of the decrease of the open area and the increase of the pressure loss and the inhibiting effect of the deterioration of the PM trapping efficiency.

Figure 6:
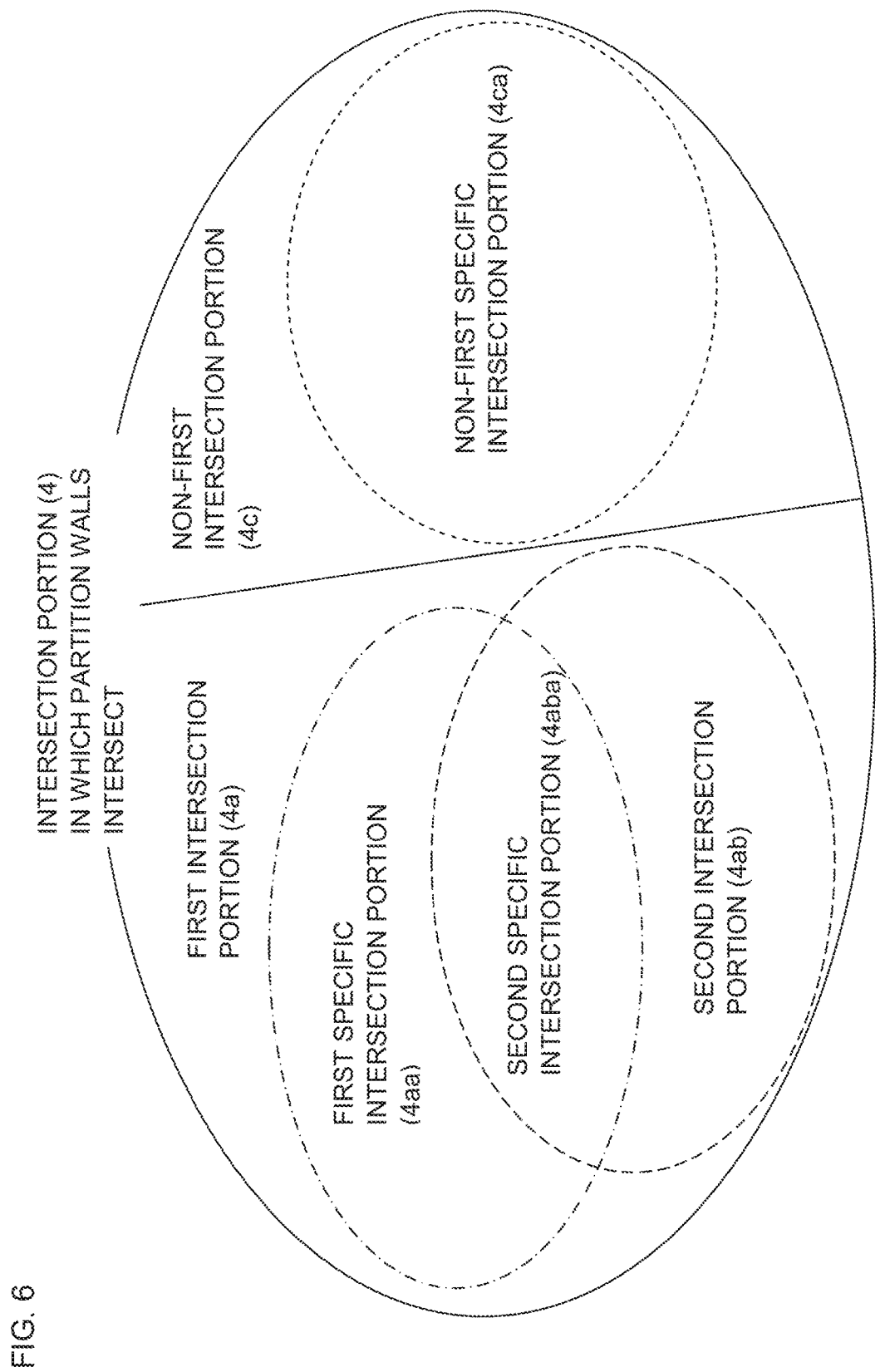
FIG. 6 is an explanatory view to explain intersection portions in which partition walls intersect in the plugged honeycomb structure of the present invention.

Here, "the intersection portions in which the partition walls intersect" in the plugged honeycomb structure of the present invention will be described in more detail with reference to FIG. 6. FIG. 6 is an explanatory view to explain the intersection portions in which the partition walls intersect in the plugged honeycomb structure of the present invention. As shown in FIG. 6, "the intersection portion (4) in which the partition walls intersect" is broadly classified into "the first intersection portion (4*a*)" and "the non-first intersection portion (4*c*)". "The first intersection portion (4*a*)" is further classified into "the first specific intersection portion (4*aa*)" and "the second intersection portion (4*ab*)". In this case, "the first specific intersection portion (4*aa*)" overlaps with "the second intersection portion (4*ab*)" in a part, and this overlapping portion becomes "the second specific intersection portion (4*aba*)". Details of "the first intersection portion (4*a*)", "the first specific intersection portion (4*aa*)", "the second intersection portion (4*ab*)" and "the second specific intersection portion (4*aba*)" have hitherto been described.

Furthermore, among "the intersection portions (4) in which the partition walls intersect", the intersection portion which does not satisfy the conditions of "the first intersection portion (4*a*)" is "the non-first intersection portion (4*c*)". Further, among "the non-first intersection portions (4*c*)", the intersection portion satisfying specific conditions is "the non-first specific intersection portion (4*ca*)".

In the plugged honeycomb structure of the present embodiment, it is preferable that the cells of at least two types of different shapes (sectional shapes) are formed in the cross section perpendicular to the cell extending direction. According to such a constitution, the first intersection portion and the non-first intersection portion are present in the cross section of the honeycomb structure body, and the first intersection portion is preferentially specified as the first specific intersection portion, so that it is possible to suitably produce various effects described above. Furthermore, in a case of forming the cells of at least two types of different shapes, it is further preferable that the cells of the at least two types of different shapes are formed to have a predetermined repeated arrangement pattern.

In the plugged honeycomb structure 100 shown in FIG. 1 to FIG. 5, there are formed the cells 2 of two types of different shapes, i.e., cells (e.g., the outflow cells 2*b*) in which a shape of each cell 2 is substantially quadrangular and cells (e.g., the inflow cells 2*a*) in which the shape of the cell 2 is substantially pentangular. Hereinafter, the shape of the cell in the cross section perpendicular to the extending direction of the cells 2 will also be referred to as "the cell shape", "the sectional shape" or "the shape of the cross section". Furthermore, the above-mentioned "repeated arrangement pattern" indicates that two or more arrangement patterns each of which is constituted of at least one outflow cell 2*b* and at least one inflow cell 2*a* are present in one honeycomb structure body 9. That is, in the one honeycomb structure body 9, the same arrangement patterns are present in two or more regions. Furthermore, "the substantially quadrangular shape" means a quadrangular shape, a shape in which at least one corner of the quadrangular shape is formed into a curve shape, or a shape in which at least one corner of the quadrangular shape is linearly chamfered. "The substantially pentangular shape" means a pentangular shape, a shape in which at least one corner of the pentangular shape is formed into a curve shape, or a shape in which at least one corner of the pentangular shape is linearly chamfered. Additionally, in a case where "substantially" is added to a word phrase indicating a polygonal shape, examples of the shape include a shape in which at least one corner of the polygonal shape is formed into a curve shape, a shape in which at least one corner of the polygonal shape is linearly chamfered, and the like.

In the plugged honeycomb structure of the present embodiment, it is preferable that the cross section perpendicular to the extending direction of the cells 2 has a constitution in which the inflow cells 2*a* surround the outflow cell 2*b*. For example, the plugged honeycomb structure 100 shown in FIG. 1 to FIG. 5 has a constitution in which the inflow cells 2*a* having substantially pentangular shape of the cell 2 surround the outflow cell 2*b* having substantially quadrangular shape of the cell 2. Here, "the inflow cells 2*a* surrounding the outflow cell 2*b*" means that the cross section perpendicular to the extending direction of the cells 2 is constituted as follows. Here, there will be described an example of the case where the cell shape of the outflow cell 2*b* is the substantially quadrangular shape as shown in FIG. 1 to FIG. 5. First, the cells are arranged so that one side of each inflow cell 2*a* is adjacent to each of four sides of the outflow cell 2*b*. In this case, the cells may be arranged so that one side of each of two or more inflow cells 2*a* is adjacent to one side of one outflow cell 2*b*. That is, the cells may be arranged so that one side of one inflow cell 2*a* is adjacent to a position of a half of one side of one outflow cell 2*b* and that one side of another inflow cell 2*a* is adjacent to a position of the other half of the one side of the one outflow cell 2*b*. Further, the cells are arranged so that all the inflow cells 2*a* adjacent to one outflow cell 2*b* face each other and so that one side of one inflow cell is adjacent to one side of the other inflow cell. When the inflow cells 2*a* are arranged in this state, it is described that "the inflow cells 2*a* surround the outflow cell 2*b*".

In the cross section of the honeycomb structure body which is perpendicular to the cell extending direction, it is preferable that the shape of at least one inflow cell is a pentangular shape or a hexagonal shape in which at least one corner is formed into a curve shape or at least one corner is linearly chamfered. For example, among the inflow cells 2*a* shown in FIG. 4, the inflow cells 2*a* present on the right side of the paper surface have a pentangular cell shape in which at least one corner is formed into the curve shape. The shape of the inflow cell may be the pentangular shape or the hexagonal shape. For example, among the inflow cells 2*a* shown in FIG. 4, the inflow cells 2*a* present on the left side of the paper surface have a pentangular cell shape. Furthermore, the shape of the inflow cell may be another polygonal shape other than the pentangular shape or the hexagonal shape, the shape in which at least one corner of the polygonal shape is formed into the curve shape, or the shape in which at least one corner of the polygonal shape is linearly chamfered.

Furthermore, it is preferable that in the cross section of the honeycomb structure body which is perpendicular to the cell extending direction, the shape of at least one outflow cell is a quadrangular shape in which at least one corner is formed into a curve shape or at least one corner is linearly chamfered. For example, among the outflow cells 2*b* shown in FIG. 4, the outflow cells 2*b* present on the right side of the paper surface have a quadrangular cell shape in which at least one corner is formed into a curve shape. The shape of the outflow cell may be a quadrangular shape. For example, among the outflow cells 2*b* shown in FIG. 4, the outflow cells 2*b* present on the left side of the paper surface have a quadrangular cell shape.

Figure 7:
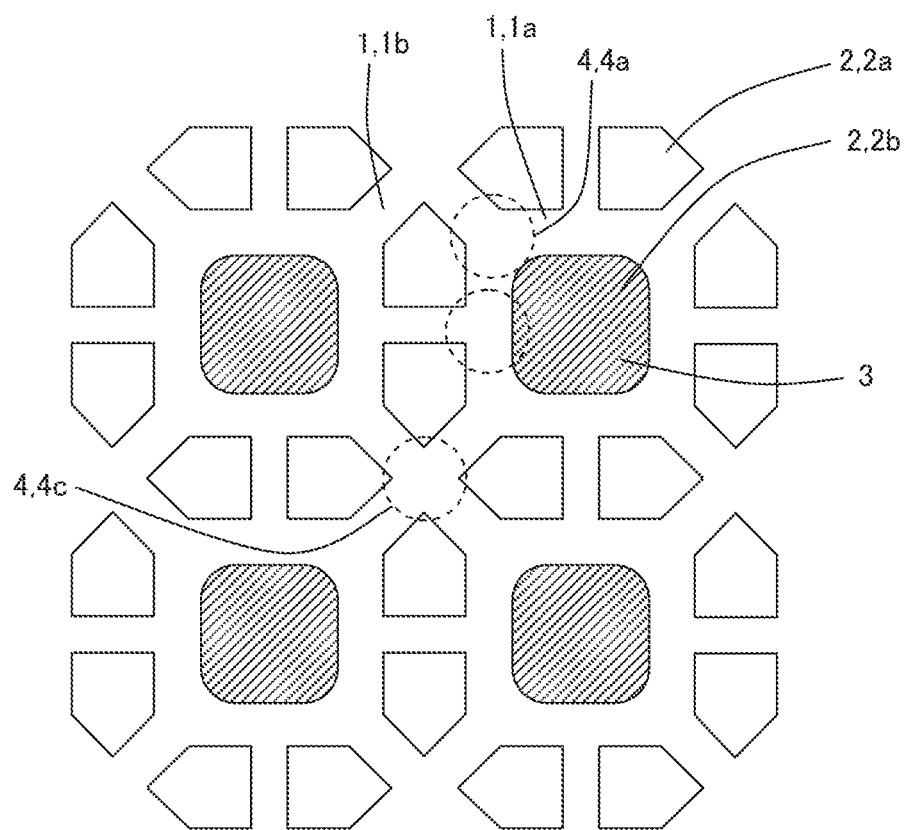
FIG. 7 is an enlarged plan view showing an enlarged part of an inflow side end face in another embodiment of the plugged honeycomb structure of the present invention.

Here, another embodiment of the plugged honeycomb structure of the present invention will be described. FIG. 7 is an enlarged plan view showing an enlarged part of an inflow side end face in another embodiment of the plugged honeycomb structure of the present invention. In the plugged honeycomb structure of this embodiment, as shown in FIG. 7, partition walls 1 define, as a plurality of cells 2, inflow cells 2*a* and outflow cells 2*b* having such cell shapes as described below. A cell shape of the inflow cell 2*a* is a pentangular shape, and a cell shape of the outflow cell 2*b* is a substantially quadrangular shape in which four corners are formed into a curve shape. Also in the plugged honeycomb structure of the embodiment, a first intersection portion 4*a* and a non-first intersection portion 4*c* have a constitution satisfying conditions of the plugged honeycomb structure of the present invention. It is to be noted that the first intersection portion 4*a* is an intersection portion 4 in which a first partition wall 1*a* intersects a second partition wall 1*b*, and the non-first intersection portion 4*c* is the intersection portion 4 in which the second partition walls 1*b* intersect each other. The first partition wall 1*a* is the partition wall 1 defining the inflow cell 2*a* and the outflow cell 2*b*, and the second partition wall 1*b* is the partition wall 1 defining the inflow cells 2*a* from each other.

Furthermore, still another embodiment of the plugged honeycomb structure of the present invention will be described. Each of FIG. 8 to FIG. 13 is an enlarged plan view showing an enlarged part of an inflow side end face in the other embodiment of the plugged honeycomb structure of the present invention. In the plugged honeycomb structure of the other embodiment, as shown in each of FIG. 8 to FIG. 13, partition walls 1 define, as a plurality of cells 2, inflow cells 2*a* and outflow cells 2*b* having such cell shapes as described below.

Figure 8:
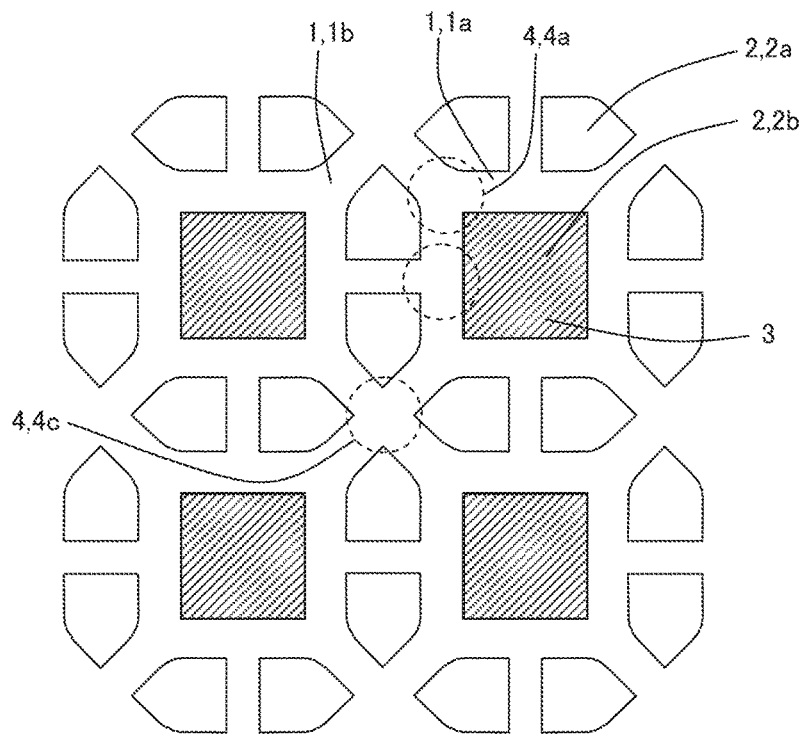
FIG. 8 is an enlarged plan view showing an enlarged part of an inflow side end face in still another embodiment of the plugged honeycomb structure of the present invention.

In FIG. 8, a cell shape of the inflow cell 2*a* is a substantially pentangular shape in which two corners are formed into a curve shape, and a cell shape of the outflow cell 2*b* is a quadrangular shape. It is to be noted that the cell shape of the inflow cell 2*a* is a substantially pentangular shape of a home base shape, and two corners adjacent to an apex angle of the pentangular home base shape is formed into a curve shape.

Figure 9:
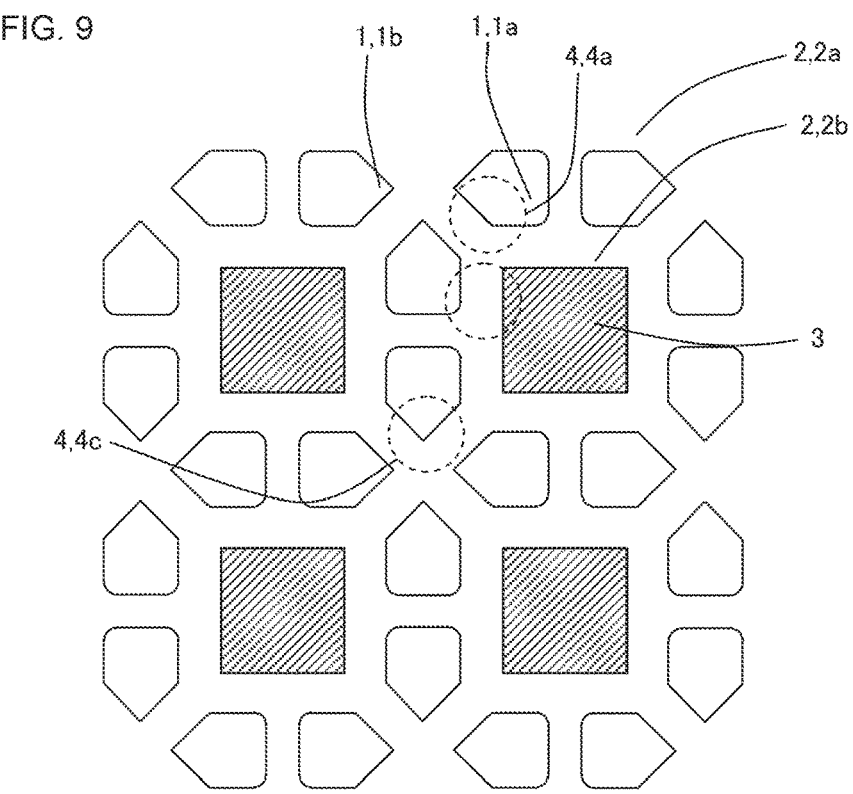
FIG. 9 is an enlarged plan view showing an enlarged part of an inflow side end face in a further embodiment of the plugged honeycomb structure of the present invention.

In FIG. 9, a cell shape of the inflow cell 2*a* is a substantially pentangular shape in which two corners are formed into a curve shape, and a cell shape of the outflow cell 2*b* is a quadrangular shape. It is to be noted that the cell shape of the inflow cell 2*a* is a substantially pentangular home base shape, and two corners which are not adjacent to an apex angle of the pentangular home base shape are formed into a curve shape.

Figure 10:
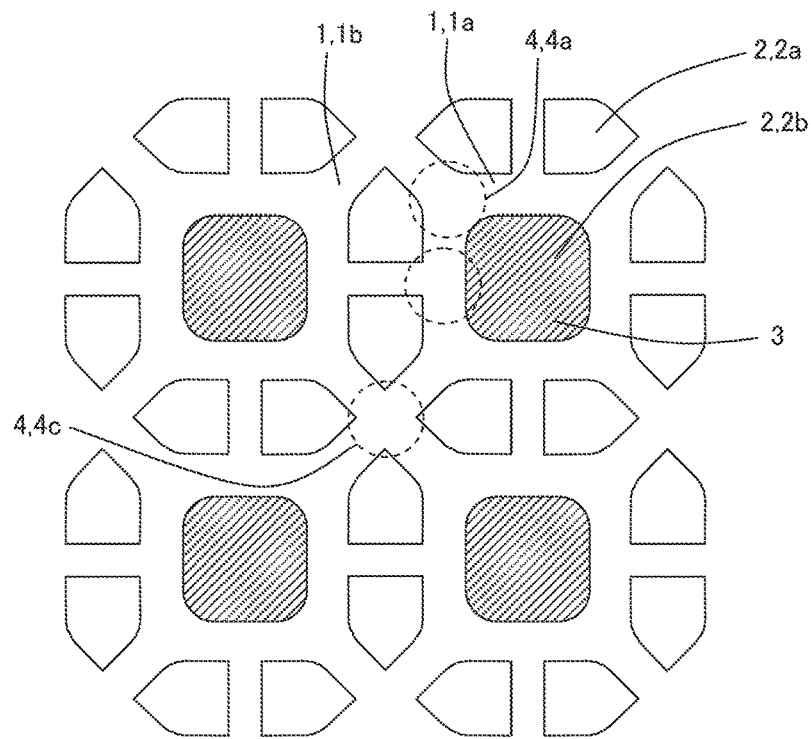
FIG. 10 is an enlarged plan view showing an enlarged part of an inflow side end face in a further embodiment of the plugged honeycomb structure of the present invention.

In FIG. 10, a cell shape of the inflow cell 2*a* is a substantially pentangular shape in which two corners are formed into a curve shape, and a cell shape of the outflow cell 2*b* is a substantially quadrangular shape in which four corners are formed into a curve shape. The cell shape of the inflow cell 2*a* is the same as the cell shape of the inflow cell 2*a* shown in FIG. 8.

Figure 11:
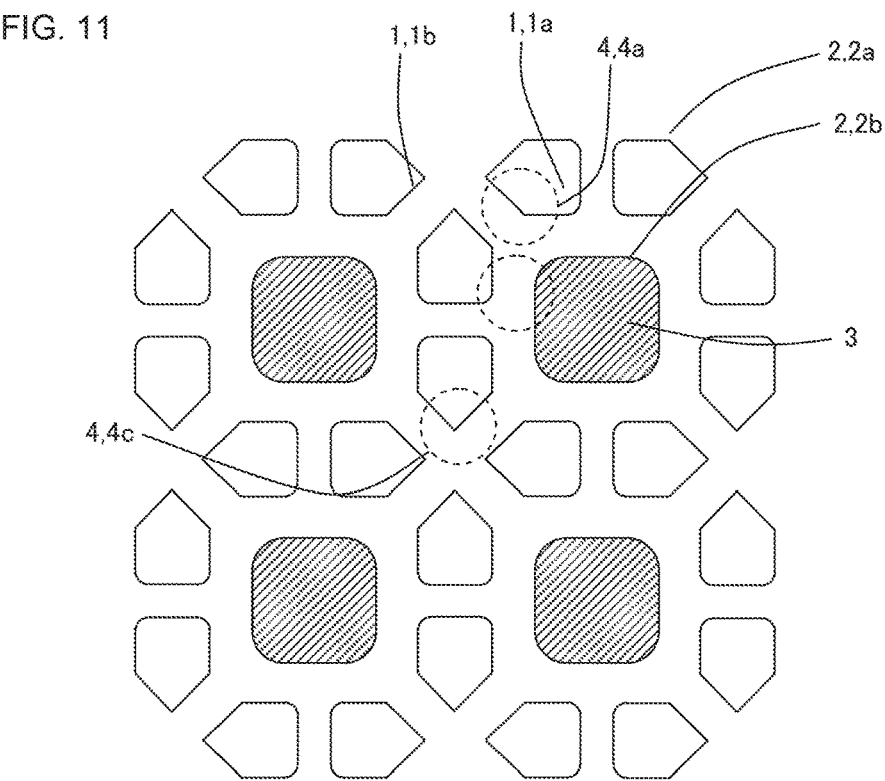
FIG. 11 is an enlarged plan view showing an enlarged part of an inflow side end face in a further embodiment of the plugged honeycomb structure of the present invention.

In FIG. 11, a cell shape of the inflow cell 2*a* is a substantially pentangular shape in which two corners are formed into a curve shape, and a cell shape of the outflow cell 2*b* is a substantially quadrangular shape in which four corners are formed into a curve shape. The cell shape of the inflow cell 2*a* is the same as the cell shape of the inflow cell 2*a* shown in FIG. 9.

Figure 12:
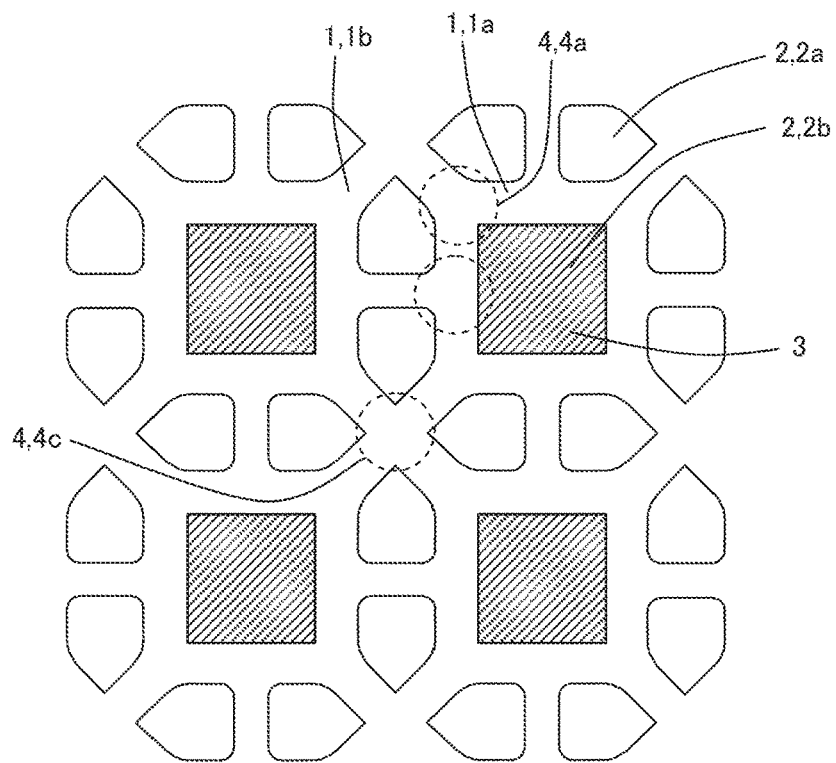
FIG. 12 is an enlarged plan view showing an enlarged part of an inflow side end face in a further embodiment of the plugged honeycomb structure of the present invention.

In FIG. 12, a cell shape of the inflow cell 2*a* is a substantially pentangular shape in which four corners are formed into a curve shape, and a cell shape of the outflow cell 2*b* is a quadrangular shape. It is to be noted that the cell shape of the inflow cell 2*a* is a substantially pentangular home base shape, and four corners other than an apex angle of the pentangular home base shape are formed into a curve shape.

Figure 13:
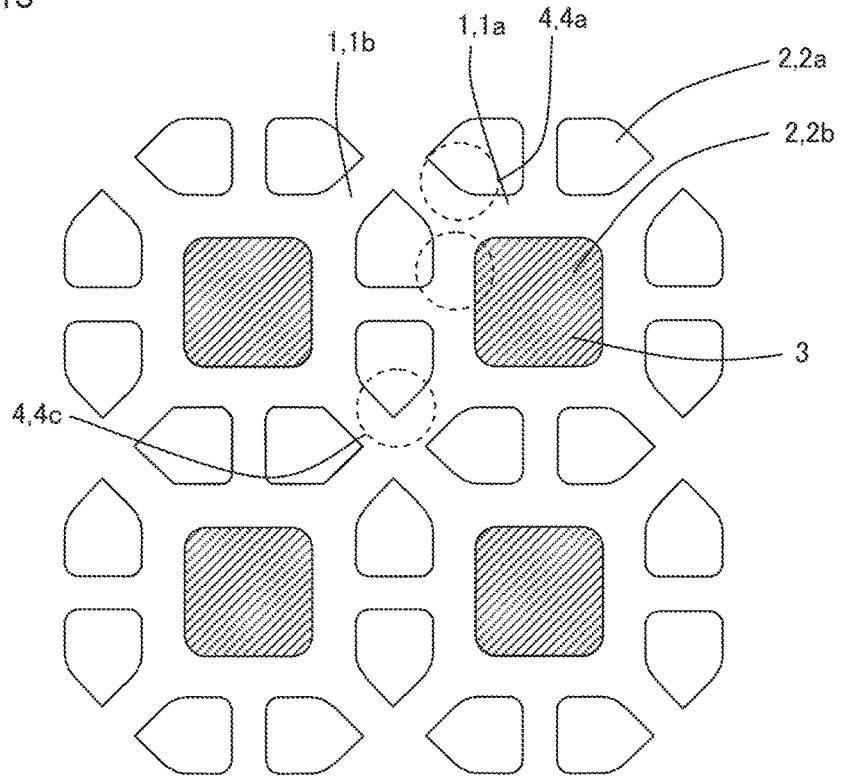
FIG. 13 is an enlarged plan view showing an enlarged part of an inflow side end face in a further embodiment of the plugged honeycomb structure of the present invention.

In FIG. 13, a cell shape of the inflow cell 2*a* is a substantially pentangular shape in which four corners are formed into a curve shape, and a cell shape of the outflow cell 2*b* is a substantially quadrangular shape in which four corners are formed into a curve shape. The cell shape of the inflow cell 2*a* is the same as the cell shape of the inflow cell 2*a* shown in FIG. 12.

Figure 14:
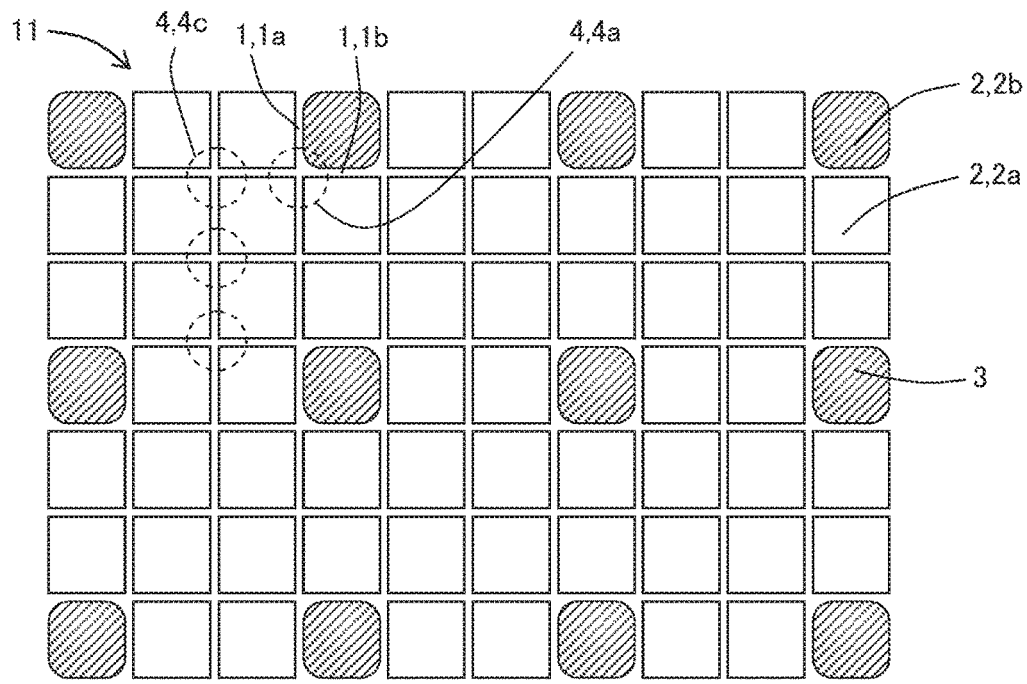
FIG. 14 is a schematic view showing one example of an arrangement pattern of cells in an inflow side end face in a further embodiment of the plugged honeycomb structure of the present invention.
Figure 15:
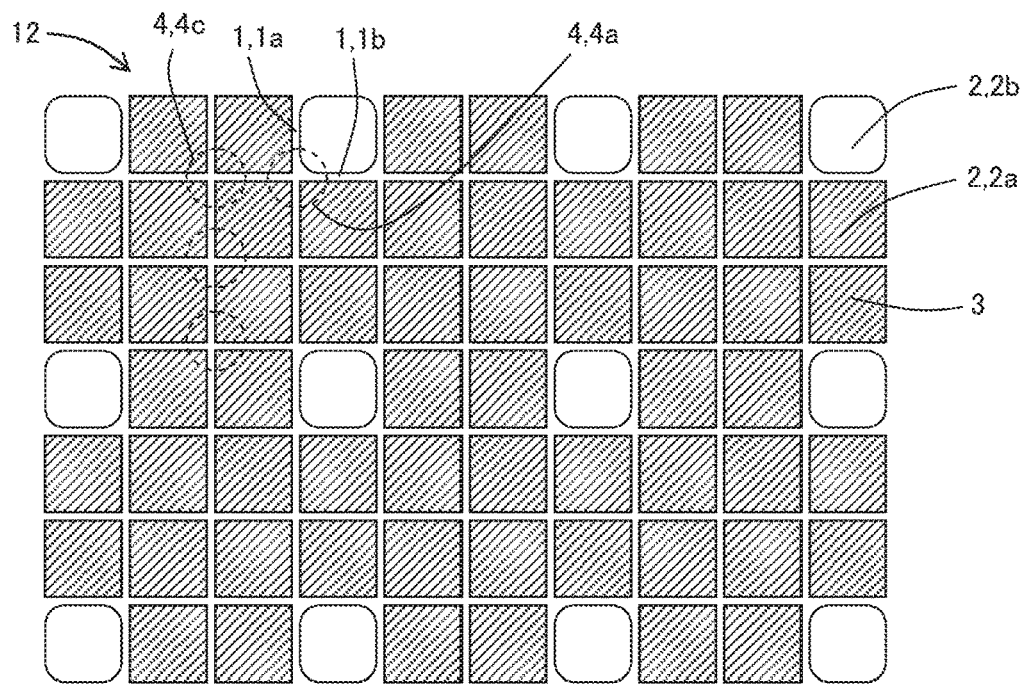
FIG. 15 is a schematic view showing an outflow side end face of the arrangement pattern of the cells shown in FIG. 14.

Furthermore, a further embodiment of the plugged honeycomb structure of the present invention will be described with reference to FIG. 14 and FIG. 15. FIG. 14 is a schematic view showing one example of an arrangement pattern of cells in an inflow side end face in the further embodiment of the plugged honeycomb structure of the present invention. FIG. 15 is a schematic view showing an outflow side end face of the arrangement pattern of the cells shown in FIG. 14. In the plugged honeycomb structure of the present embodiment, as shown in FIG. 14 and FIG. 15, partition walls 1 define a plurality of cells 2 having a substantially quadrangular cell shape. Also in the plugged honeycomb structure shown in FIG. 14 and FIG. 15, a first intersection portion 4*a* and non-first intersection portion 4*c* are constituted to satisfy conditions of the plugged honeycomb structure of the present invention. In FIG. 14 and FIG.

15, sign 2a shows an inflow cell, sign 2b shows an outflow cell, sign 1a shows a first partition wall, and sign 1b shows a second partition wall.

Figure 16:
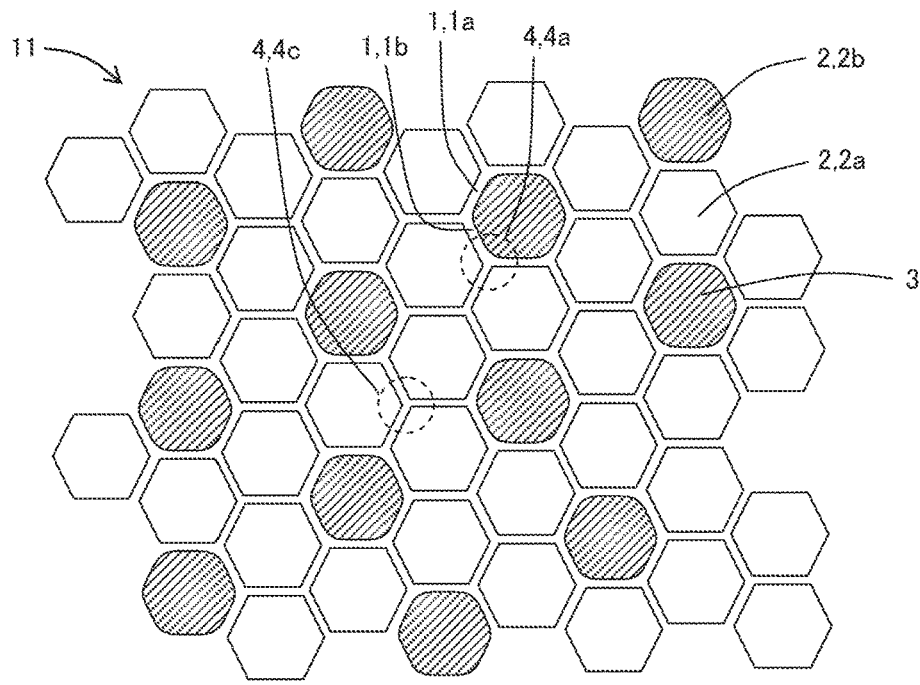
FIG. 16 is a schematic view showing one example of an arrangement pattern of cells in an inflow side end face in a still further embodiment of the plugged honeycomb structure of the present invention.
Figure 17:
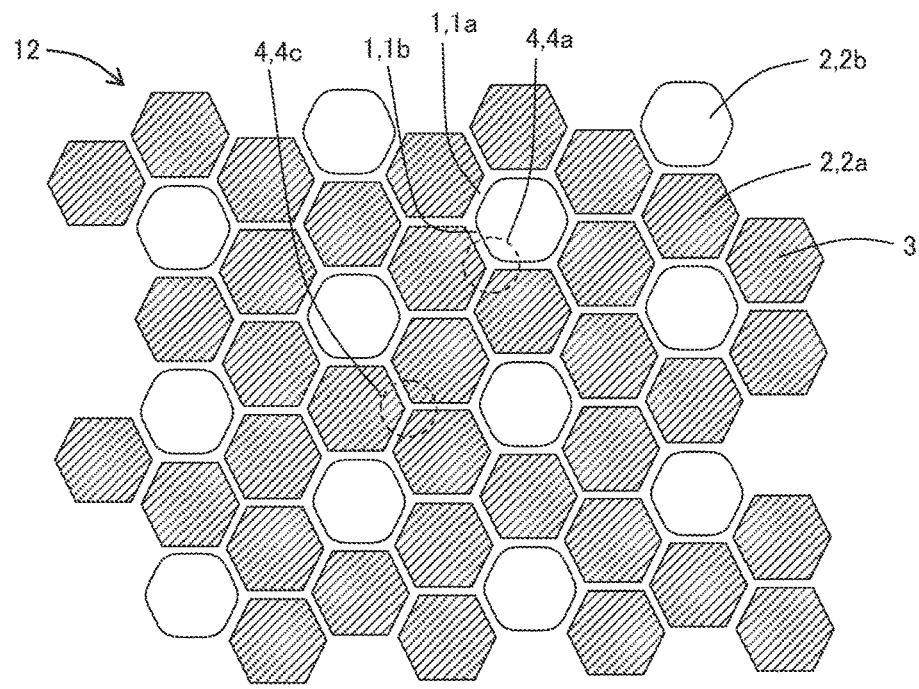
FIG. 17 is a schematic view showing an outflow side end face of the arrangement pattern of the cells shown in FIG. 16.

Furthermore, a still further embodiment of the plugged honeycomb structure of the present invention will be described with reference to FIG. 16 and FIG. 17. FIG. 16 is a schematic view showing one example of an arrangement pattern of cells in an inflow side end face in the still further embodiment of the plugged honeycomb structure of the present invention. FIG. 17 is a schematic view showing an outflow side end face of the arrangement pattern of the cells shown in FIG. 16. In the plugged honeycomb structure of the present embodiment, as shown in FIG. 16 and FIG. 17, partition walls 1 define a plurality of cells 2 having a substantially hexagonal cell shape. Also in the plugged honeycomb structure shown in FIG. 16 and FIG. 17, a first intersection portion 4a and a non-first intersection portion 4c are constituted to satisfy conditions of the plugged honeycomb structure of the present invention. In FIG. 16 and FIG. 17, sign 2a shows an inflow cell, sign 2b shows an outflow cell, sign 1a shows a first partition wall, and sign 1b shows a second partition wall. In FIG. 7 to FIG. 17, reference numeral 3 shows a plugging portion.

Here, there is not any special restriction on the whole shape of the plugged honeycomb structure. For example, the whole shape of the plugged honeycomb structure 100 shown in FIG. 1 is a round pillar shape in which an inflow side end face 11 and an outflow side end face 12 are circular. Additionally, although not shown in the drawings, the whole shape of the plugged honeycomb structure may be a pillar shape in which the inflow side end face and the outflow side end face have a substantially circular shape such as an elliptic shape, a race track shape or an oblong shape. Furthermore, the whole shape of the plugged honeycomb structure may be a prismatic columnar shape in which the inflow side end face and the outflow side end face have a polygonal shape such as a quadrangular shape or a hexagonal shape.

There is not any special restriction on a material constituting the partition walls of the honeycomb structure body, but from the viewpoints of strength, heat resistance, durability and the like, it is preferable that main components are various ceramics of oxides or non-oxides, a metal or the like. Specifically, it is preferable that an example of the ceramics is made of a material including at least one selected from the group consisting of cordierite, mullite, alumina, spinel, silicon carbide, silicon nitride, and aluminum titanate. It is considered that examples of the metal include Fe—Cr—Al based metal, metal silicon and the like. It is preferable that the material includes at least one selected from these materials as the main component. From the viewpoints of high strength, high heat resistance and the like, it is especially preferable that the material includes, as the main component, at least one selected from the group consisting of alumina, mullite, aluminum titanate, cordierite, silicon carbide, and silicon nitride. Furthermore, from the viewpoints of high thermal conductivity, high heat resistance and the like, silicon carbide or a silicon-silicon carbide composite material is especially suitable. Here, "the main component" means a component which is present as much as 50 mass % or more, preferably 70 mass % or more, and further preferably 80 mass % or more in the components.

There is not any special restriction on a material of the plugging portions. It is preferable that the material of the plugging portions include at least one selected from the above-mentioned suitable materials of the partition walls, e.g., various ceramics, metals and the like.

A thickness of the partition walls in the cross section perpendicular to the cell extending direction is preferably from 70 to 510 μm, further preferably from 100 to 350 μm, and especially preferably from 150 to 310 μm. Here, the thickness of the partition walls is such a thickness as described below. In the partition wall defining the inflow cells, the shortest distance between the two inflow cells defined by the partition wall is the thickness of the partition wall. In the partition wall defining the outflow cells, the shortest distance between two outflow cells defined by the partition wall is the thickness of the partition wall. In the partition wall defining the inflow cell and the outflow cell, the shortest distance between the inflow cell and the outflow cell is the thickness of the partition wall.

A porosity of the partition walls is preferably from 25 to 75%, further preferably from 30 to 70%, and especially preferably from 40 to 65%. When the porosity of the partition walls is smaller than 25%, there is the fear that the pressure loss increases. When the porosity of the partition walls is in excess of 75%, there is the fear that the cracks in the intersection portions of the partition walls are easy to grow. The porosity is a value measured by a mercury porosimeter.

In the plugged honeycomb structure of the present embodiment, a cell cross section open frontal area of the inflow cells 2a is preferably from 20 to 70% and further preferably from 25 to 65%. When the cell cross section open frontal area of the inflow cells 2a is smaller than 20%, an initial pressure loss unfavorably increases. Furthermore, when the open frontal area is larger than 70%, a filtration rate increases, the PM trapping efficiency therefore deteriorates, and further, the strength of the partition walls 1 unfavorably runs short. Here, "the cell cross section open frontal area of the inflow cells 2a" means a ratio of "a sum total of sectional areas of the inflow cells 2a" to a total of "a whole sectional area of the partition walls 1 formed in the plugged honeycomb structure" and "a sum total of sectional areas of all the cells 2" in a cross section of the plugged honeycomb structure which is vertical to a central axis direction.

In the plugged honeycomb structure of the present embodiment, a hydraulic diameter of each of the plurality of cells 2 is preferably from 0.5 to 2.5 mm and further preferably from 0.8 to 2.2 mm. When the hydraulic diameter of each of the plurality of cells 2 is smaller than 0.5 mm, the initial pressure loss unfavorably increases. Furthermore, when the hydraulic diameter of each of the plurality of cells 2 is larger than 2.5 mm, a contact area between the exhaust gas and the partition wall 1 decreases, and a purifying efficiency unfavorably deteriorates. Here, the hydraulic diameter of each of the plurality of cells 2 is a value calculated by 4×(a sectional area)/(a peripheral length) on the basis of the sectional area and peripheral length of each cell 2. The sectional area of the cell 2 indicates an area of a shape (the sectional shape) of the cell which appears in the cross section vertical to the central axis direction of the plugged honeycomb structure, and the peripheral length of the cell indicates a length of a periphery of the sectional shape of the cell (a length of a closed line surrounding the cross section).

Furthermore, in the plugged honeycomb structure of the present embodiment, a geometric surface area GSA in the inflow cell 2a is preferably from 10 to 30 $cm^2/cm^3$ and further preferably from 12 to 18 $cm^2/cm^3$. Here, the above-mentioned "geometric surface area GSA" is a value (S/V) obtained by dividing a total inner surface area (S) of the inflow cells 2a by a total volume (V) of the honeycomb structure body. Usually, when a filtration area of a filter increases, it is possible to decrease a thickness of the PM to be deposited on the partition walls, and hence in the above-mentioned numeric range of the geometric surface area GSA, it is possible to suppress the pressure loss of the plugged honeycomb structure. Therefore, when the geometric surface area GSA of the inflow cells $2a$ is smaller than 10 $cm^2/cm^3$, the pressure loss during PM deposition unfavorably increases. Furthermore, when the geometric surface area is larger than 30 $cm^2/cm^3$, the initial pressure loss unfavorably increases.

In view of tradeoff between the initial pressure loss and the pressure loss during the PM deposition and the trapping efficiency, in the plugged honeycomb structure of the present embodiment, it is preferable to simultaneously satisfy the conditions that the geometric surface area GSA of the inflow cells $2a$ is from 10 to 30 $cm^2/cm^3$, the cell cross section open frontal area of the inflow cells $2a$ is from 20 to 70% and the hydraulic diameter of each of the plurality of cells $2$ is from 0.5 to 2.5 mm. Furthermore, it is more preferable to simultaneously satisfy the conditions that the geometric surface area GSA of the inflow cells $2a$ is from 12 to 18 $cm^2/cm^3$, the cell cross section open frontal area of the inflow cells $2a$ is from 25 to 65% and the hydraulic diameter of each of the plurality of cells $2$ is from 0.8 to 2.2 mm.

In the plugged honeycomb structure of the present embodiment, a catalyst may be loaded onto the partition walls $1$ forming the plurality of cells $2$. The loading of the catalyst onto the partition walls $1$ indicates that the surfaces of the partition walls $1$ and inner walls of pores formed in the partition walls $1$ are coated with the catalyst. Examples of a type of catalyst include an SCR catalyst (zeolite, titania, vanadium) and a three-way catalyst including at least two noble metals selected from the group consisting of Pt, Rh and Pd and at least one selected from the group consisting of alumina, ceria and zirconia. When this catalyst is loaded, it is possible to detoxify NOx, CO, HC and the like included in the exhaust gas emitted from a direct injection type gasoline engine, a diesel engine or the like, and it is also possible to easily burn and remove the PM deposited on the surfaces of the partition walls $1$ by a catalytic action.

In the plugged honeycomb structure of the present embodiment, there is not any special restriction on a method of loading the above-mentioned catalyst, and a method to be usually performed by a person skilled in the art is employable. Specifically, an example of the method is a method of wash-coating the partition walls with a catalyst slurry, followed by drying and firing.

(2) Manufacturing Method of Plugged Honeycomb Structure:

There is not any special restriction on a manufacturing method of the plugged honeycomb structure of the present embodiment shown in FIG. 1 to FIG. 5, and it is possible to manufacture the plugged honeycomb structure by, for example, the following method. First, there is prepared a plastic kneaded material to prepare the honeycomb structure body. The kneaded material to prepare the honeycomb structure body can be prepared by suitably adding an additive such as a binder, and water to a material selected as raw material powder from the above-mentioned suitable materials of the partition walls.

Next, the prepared kneaded material is extruded to obtain a pillar-shaped honeycomb formed body having partition walls defining a plurality of cells and a circumferential wall disposed at an outermost circumference. In the extrusion, it is preferable to use a die having a desirable cell shape, partition wall thickness and cell density as a die for the extrusion. Further, it is further preferable to use, as this die, a die constituted so that intersection portions of the partition walls of the extruded honeycomb formed body satisfy the constitution of the plugged honeycomb structure of the present embodiment after firing.

The obtained honeycomb formed body is dried by, for example, microwaves and hot air, and open ends of the cells are plugged with a material similar to the material used in manufacturing the honeycomb formed body, thereby arranging the plugging portions. After arranging the plugging portions, the honeycomb formed body may further be dried.

Furthermore, as to the intersection portions of the partition walls of the honeycomb formed body, for example, after the extrusion and drying, for example, a slurry may be poured into corners of the predetermined cells, thereby coating first intersection portions of the predetermined partition walls with the slurry including a ceramics material, to thicken the first intersection portions. Thus, the predetermined first intersection portions are coated with the above slurry until the first intersection portions satisfy the conditions of first specific intersection portions, so that the first intersection portions may be formed as the first specific intersection portions. When pouring the slurry into the corners of the predetermined cells, it is preferable that a mask is applied to close the open ends of the residual cells other than the predetermined cells and that the slurry is poured only into the predetermined cells. Furthermore, an example of another method of forming the first intersection portions as the first specific intersection portions is a method of intentionally pouring slurry having a high viscosity into the corners of the predetermined cells, to thicken the first intersection portions.

Next, the honeycomb formed body including the plugging portions is fired to obtain the plugged honeycomb structure. A firing temperature and a firing atmosphere differ with a raw material, and the person skilled in the art can select the firing temperature and firing atmosphere which are most suitable for the selected material.

EXAMPLES

Example 1

To 100 parts by mass of a cordierite forming raw material, there were added 13 parts by mass of a pore former, 35 parts by mass of a dispersing medium, 6 parts by mass of an organic binder and 0.5 part by mass of a dispersing agent, followed by mixing and kneading, to prepare a kneaded material. As the cordierite forming raw material, alumina, aluminum hydroxide, kaolin, talc and silica were used. As the dispersing medium, water was used, and as the pore former, cokes having an average particle diameter of 1 to 10 μm were used, and as the organic binder, hydroxypropyl methylcellulose was used, and as the dispersing agent, ethylene glycol was used.

Next, the kneaded material was extruded by using a die for preparation of a honeycomb formed body, to obtain the honeycomb formed body in which the whole shape was a round pillar shape. In the honeycomb formed body, partition walls defined cells having a substantially quadrangular cell shape and cells having a substantially pentangular cell shape. Further, the honeycomb formed body had a constitution in which eight substantially pentangular cells surrounded the substantially quadrangular cell. For example, the honeycomb formed body had a repeated arrangement pattern of the cells as shown in FIG. 4.

Next, the honeycomb formed body was dried with a microwave drier and further completely dried with a hot air drier, and then both end faces of the honeycomb formed body were cut to adjust the honeycomb formed body into a predetermined dimension.

Next, the whole region of one end face of the honeycomb formed body was covered with a film, and bore portions were made at positions of the film which corresponded to substantially quadrangular cell open ends. Next, the end portion of the honeycomb formed body which was covered with the film was immersed into a slurried plugging material containing the cordierite forming raw material, thereby charging the substantially quadrangular cell open ends with the plugging material. The one end face of the honeycomb formed body was formed as an inflow side end face in a finally obtained plugged honeycomb structure.

Next, the whole region of the other end face of the honeycomb formed body was covered with a film, and bore portions were made at positions of the film which corresponded to substantially pentangular cell open ends. Next, an end portion of the honeycomb formed body which was covered with the film was immersed into the slurried plugging material containing the cordierite forming raw material, thereby charging the substantially pentangular cell open ends with the plugging material. The other end face of the honeycomb formed body was formed as an outflow side end face in the finally obtained plugging honeycomb structure.

Next, the honeycomb formed body in which the open end of each cell was charged with the plugging material was degreased and fired to manufacture the plugged honeycomb structure of Example 1.

The obtained plugged honeycomb structure had such a cell arrangement as shown in FIG. 2. A thickness of partition walls constituting a honeycomb structure body was 320 μm. The thickness of the partition walls is a value measured by using an optical microscope. A porosity of the partition walls was 60%. The porosity is a value measured by a mercury porosimeter. Furthermore, the plugged honeycomb structure had a round pillar shape in which a diameter of each end face was 144 mm. A length of the plugged honeycomb structure in a cell extending direction was 152 mm. Table 1 shows the cell arrangement, partition wall thickness and porosity. Furthermore, a length (a substantially quadrangular cell pitch) denoted with a sign a of FIG. 4 of an enlarged schematic view of FIG. 2 was 2.2 mm, and a length (a substantially pentangular cell pitch) denoted with a sign b of FIG. 4 was 1.76 mm. It is to be noted that each of the cell pitches denoted with the signs a and b is a distance between centers of thicknesses of two partition walls forming each cell.

TABLE 1

|  | Cell arrangement | Partition wall thickness (μm) | Porosity (%) |
| --- | --- | --- | --- |
| Example 1 | FIG. 2 | 320 | 60 |
| Example 2 | FIG. 2 | 320 | 60 |
| Example 3 | FIG. 2 | 320 | 60 |
| Example 4 | FIG. 2 | 320 | 60 |
| Example 5 | FIG. 2 | 320 | 60 |
| Example 6 | FIG. 2 | 320 | 60 |
| Example 7 | FIG. 2 | 320 | 60 |
| Example 8 | FIG. 2 | 320 | 60 |
| Example 9 | FIG. 2 | 320 | 60 |
| Example 10 | FIG. 2 | 320 | 60 |
| Example 11 | FIG. 2 | 320 | 60 |
| Example 12 | FIG. 2 | 320 | 60 |
| Example 13 | FIG. 2 | 320 | 60 |

TABLE 1-continued

|  | Cell arrangement | Partition wall thickness (μm) | Porosity (%) |
| --- | --- | --- | --- |
| Example 14 | FIG. 2 | 320 | 60 |
| Example 15 | FIG. 2 | 200 | 60 |
| Example 16 | FIG. 2 | 320 | 45 |
| Example 17 | FIG. 2 | 320 | 60 |
| Comparative Example 1 | FIG. 2 | 320 | 60 |
| Comparative Example 2 | FIG. 2 | 320 | 60 |
| Comparative Example 3 | FIG. 2 | 320 | 60 |
| Comparative Example 4 | FIG. 2 | 320 | 60 |
| Example 18 | FIG. 16 | 320 | 60 |
| Example 19 | FIG. 14 | 320 | 60 |

In the plugged honeycomb structure of Example 1, a percentage of first intersection portions to all intersection portions was 89% and a percentage of non-first intersection portions to all the intersection portions was 11%. In Table 2, a column of "the percentage (number %) of the first intersection portions" shows a number percentage (number %) of the first intersection portions to all the intersection portions. The plugged honeycomb structure of Example 1 had, as the intersection portions in which the partition walls intersected, the intersection portion in which three partition walls intersected and the intersection portion in which four partition walls intersected. Hereinafter, the intersection portion in which the three partition walls intersect will also be referred to as "a three-side intersection portion" and the intersection portion in which the four partition walls intersect will also be referred to as "a four-side intersection portion".

Furthermore, the three-side intersection portion which is the first intersection portion will also be referred to as "a three-side first intersection portion", and further, the three-side intersection portion which is the first specific intersection portion will also be referred to as "a three-side first specific intersection portion". Furthermore, the four-side intersection portion which is the first intersection portion will also be referred to as "a four-side first intersection portion", and further, the four-side intersection portion which is the first specific intersection portion will also be referred to as "a four-side first specific intersection portion". Furthermore, similarly to the first intersection portions, the non-first intersection portions will suitably be referred to as "a three-side non-first intersection portion", "a three-side non-first specific intersection portion", "a four-side non-first intersection portion", and "a four-side non-first specific intersection portion".

As to the plugged honeycomb structure of Example 1, a number percentage of the first specific intersection portions to all the first intersection portions was obtained. The number percentage of the first specific intersection portions to all the first intersection portions was 30%. In Table 2, a column of "the percentage (number %) of the first specific intersection portions" shows the number percentage (number %) of the first specific intersection portions to all the first intersection portions.

Furthermore, as to the first specific intersection portion of the plugged honeycomb structure of Example 1, there was obtained a diameter D1 of a maximum inscribed circle including a part of the first specific intersection portion and coming in contact with an inflow cell and an outflow cell. Furthermore, as to the first specific intersection portion of the plugged honeycomb structure of Example 1, a shortest distance L1 between the inflow cell and the outflow cell in the first specific intersection portion was obtained. Further, there was obtained a value "D1/L1" by dividing the diameter D1 of the maximum inscribed circle of the first specific intersection portion by the shortest distance L1. "D1/L1 of the three-side first specific intersection portion" was 1.25. In Table 2, a column of "D1/L1 of the three-side first specific intersection portion" shows the value of "D1/L1".

Furthermore, as to the plugged honeycomb structure of Example 1, a number percentage of the non-first specific intersection portions to all the non-first intersection portions was obtained. The number percentage of the non-first specific intersection portions to all the non-first intersection portions was 100%. In Table 3, a column of "the percentage (number %) of the non-first specific intersection portions" shows the number percentage (number %) of the non-first specific intersection portions to all the non-first intersection portions.

Furthermore, as to the plugged honeycomb structure of Example 1, the number of second intersection portions and the number of second specific intersection portions were obtained. Further, a number percentage of the second intersection portions to all the first intersection portions and a number percentage of the second specific intersection portions to all the first intersection portions were obtained. In Table 2, a column of "the percentage (number %) of the second intersection portions" shows the number percentage (number %) of the second intersection portions to all the first intersection portions. In Table 3, a column of "the percentage (number %) of the second specific intersection portions" shows the number percentage (number %) of the second specific intersection portions to all the first intersection portions.

TABLE 2

|  | Percentage of first intersection portions (number %) | Percentage of first specific intersection portions (number %) | D1/L1 of three-side first specific intersection portion | D1/L1 of four-side first specific intersection portion |
|---|---|---|---|---|
| Example 1 | 89 | 30 | 1.25 | — |
| Example 2 | 89 | 50 | 1.25 | — |
| Example 3 | 89 | 80 | 1.25 | — |
| Example 4 | 89 | 100 | 1.25 | — |
| Example 5 | 89 | 30 | 1.52 | — |
| Example 6 | 89 | 50 | 1.52 | — |
| Example 7 | 89 | 90 | 1.52 | — |
| Example 8 | 89 | 30 | 1.75 | — |
| Example 9 | 89 | 50 | 1.75 | — |
| Example 10 | 89 | 90 | 1.75 | — |
| Example 11 | 89 | 80 | 1.25 | — |
| Example 12 | 89 | 80 | 1.25 | — |
| Example 13 | 89 | 80 | 1.25 | — |
| Example 14 | 89 | 80 | 1.25 | — |
| Example 15 | 89 | 80 | 1.25 | — |
| Example 16 | 89 | 80 | 1.25 | — |
| Example 17 | 89 | 80 | 1.18 | — |
| Comparative Example 1 | 89 | 0 | — | — |
| Comparative Example 2 | 89 | 20 | 1.25 | — |
| Comparative Example 3 | 89 | 0 | 1.90 | — |
| Comparative Example 4 | 89 | 80 | 1.25 | — |
| Example 18 | ** | 80 | — | 1.55 |
| Example 19 | ** | 80 | 1.25 | — |

TABLE 3

|  | Percentage of non-first specific intersection portions (number %) | D0/L0 of three-side non-first specific intersection portion | D0/L0 of four-side non-first specific intersection portion | Percentage of second intersection portions (number %) | Percentage of second specific intersection portions (number %) |
|---|---|---|---|---|---|
| Example 1 | 100 | — | 1.40 | 50 | 100 |
| Example 2 | 100 | — | 1.40 | 50 | 100 |
| Example 3 | 100 | — | 1.40 | 50 | 100 |
| Example 4 | 100 | — | 1.40 | 50 | 100 |
| Example 5 | 100 | — | 1.40 | 50 | 100 |
| Example 6 | 100 | — | 1.40 | 50 | 100 |
| Example 7 | 100 | — | 1.40 | 50 | 100 |
| Example 8 | 100 | — | 1.40 | 50 | 100 |
| Example 9 | 100 | — | 1.40 | 50 | 100 |
| Example 10 | 100 | — | 1.40 | 50 | 100 |
| Example 11 | 30 | — | 1.40 | 50 | 100 |
| Example 12 | 80 | — | 1.40 | 50 | 100 |
| Example 13 | 100 | — | 1.40 | 50 | 80 |
| Example 14 | 100 | — | 1.40 | 50 | 20 |
| Example 15 | 100 | — | 1.40 | 50 | 100 |
| Example 16 | 100 | — | 1.40 | 50 | 100 |
| Example 17 | 100 | — | 1.40 | 50 | 100 |
| Comparative Example 1 | 100 | — | 1.40 | 50 | 0 |
| Comparative Example 2 | 100 | — | 1.40 | 50 | 100 |
| Comparative Example 3 | 100 | — | 1.40 | 50 | 100 |
| Comparative Example 4 | 10 | — | 1.40 | 50 | 100 |
| Example 18 | 100 | — | 1.40 | — | — |
| Example 19 | 100 | 1.16 | — | — | — |

As to the plugged honeycomb structure of Example 1, evaluations of "trapping efficiency deterioration at a crack generation time", "a pressure loss" and "an isostatic strength" were carried out by the following methods. Furthermore, "a general evaluation" was carried out on the basis of the evaluation results. Table 4 shows the evaluation results of the respective evaluations.

(Trapping Efficiency Deterioration at Crack Generation Time)

In an engine bench in which a 2.2 L diesel engine was mounted, a predetermined amount of PM was deposited in each of honeycomb filters (plugged honeycomb structures) of examples and comparative examples on constant operation conditions. Afterward, a regeneration treatment by post injection was performed to raise an inlet gas temperature of the honeycomb filter, and when pressure losses before and after the honeycomb filter started decreasing, the post injection was stopped and the engine was changed to an idle state. The predetermined amount of the PM to be deposited prior to the regeneration treatment gradually increased to generate cracks in the honeycomb filter. Afterward, an exhaust gas including soot flowed into the cracked honeycomb filter (carrier) on conditions that a soot generation amount was 5 g/hour and a gas (the exhaust gas) flow rate was 1.5 $Nm^3$/min by use of a device which incompletely burned light oil fuel to generate the soot. In this case, there were measured soot concentrations in the gases in an upstream (before supplying the gas to the carrier) and a downstream (after emitting the gas from the carrier) initially for one minute, and there was calculated a ratio between the soot concentration in the upstream gas and the soot concentration in the downstream gas (the soot concentration in the downstream gas/the soot concentration in the upstream gas). The calculated ratio between the soot concentrations was obtained as a soot trapping efficiency, and was compared with the soot trapping efficiency measured on the same conditions prior to the generation of the cracks, and the evaluations were carried out in accordance with the following evaluation standards.

A: The deterioration of the trapping efficiency which is smaller than 3% is excellent and is determined as evaluation "A".

B: The deterioration of the trapping efficiency which is 3% or more and smaller than 10% is good and is determined as evaluation "B".

C: The deterioration of the trapping efficiency which is 10% or more and smaller than 15% is passable and is determined as evaluation "C".

D: The deterioration of the trapping efficiency which is 15% or more is a failure and is determined as evaluation "D".

(Pressure Loss)

The honeycomb filter (the plugged honeycomb structure) was attached to an exhaust pipe of the 2.2 L diesel engine, and the engine was operated on constant conditions that an engine revolution number was 1800 rpm and an engine torque was 40 Nm, to deposit PM in the honeycomb filter. At this time, a behavior of the pressure loss to the amount of the PM to be deposited was measured, and a value of 4 g/L of the amount of the PM to be deposited was obtained as a value of the pressure loss with the PM. In each of cell structures, the value was compared with a value of a pressure loss of a sample in which all first intersection portions were not first specific intersection portions and all non-first intersection portions were non-first specific intersection portions to carry out an evaluation of an increase ratio of the pressure loss.

A: The increase ratio of the pressure loss which is smaller than 5% is excellent and is determined as evaluation "A".

B: The increase ratio of the pressure loss which is 5% or more and smaller than 10% is good and is determined as evaluation "B".

C: The increase ratio of the pressure loss which is 10% or more and is smaller than 20% is passable and is determined as evaluation "C".

D: The increase ratio of the pressure loss which is 20% or more is a failure and is determined as evaluation "D".

(Isostatic Strength)

An isostatic strength was measured on the basis of an isostatic breaking strength test stipulated in a car standard (JASO Standard) M505-87 issued by the society of Automotive Engineers of Japan. The isostatic breaking strength test is a test operation of placing the plugged honeycomb structure in a tubular container of rubber and closing the container with a lid made of an aluminum plate to perform isotropic pressurizing compression in water. That is, the isostatic breaking strength test is a test which simulates compressive load addition in a case of holding a circumferential surface of the plugged honeycomb structure in a can member. The isostatic strength measured by this isostatic breaking strength test is indicated by an adding pressure value (MPa) when the plugged honeycomb structure breaks. In accordance with the following evaluation standards, the isostatic strength was evaluated.

A: A case where the isostatic strength is 1.5 MPa or more is excellent and is determined as evaluation "A".

B: A case where the isostatic strength is 0.7 MPa or more and smaller than 1.5 MPa is good and is determined as evaluation "B".

D: A case where the isostatic strength is smaller than 0.7 MPa is a failure and is determined as evaluation "D".

(General Evaluation)

In the above-mentioned respective evaluation items, the lowest evaluation value was regarded as the general evaluation. It is to be noted that for the respective evaluations, the evaluation of A is highest, and further, the evaluation lowers in order of B, C and D.

TABLE 4

| | Trapping efficiency deterioration at crack generation time | Pressure loss | Isostatic strength | General evaluation |
|---|---|---|---|---|
| Example 1 | A | A | A | A |
| Example 2 | A | A | A | A |
| Example 3 | A | B | A | B |
| Example 4 | A | B | A | B |
| Example 5 | A | A | A | A |
| Example 6 | A | B | A | B |
| Example 7 | A | B | A | B |
| Example 8 | A | B | A | B |
| Example 9 | A | B | A | B |
| Example 10 | A | C | A | C |
| Example 11 | A | B | A | B |
| Example 12 | A | C | A | C |
| Example 13 | A | B | A | B |
| Example 14 | A | B | A | B |
| Example 15 | A | A | B | B |
| Example 16 | A | C | A | C |
| Example 17 | B | B | B | B |
| Comparative Example 1 | D | A | B | D |
| Comparative Example 2 | D | A | B | D |
| Comparative Example 3 | A | D | A | D |
| Comparative Example 4 | A | D | A | D |

TABLE 4-continued

| | Trapping efficiency deterioration at crack generation time | Pressure loss | Isostatic strength | General evaluation |
|---|---|---|---|---|
| Example 18 | A | B | A | B |
| Example 19 | A | B | A | B |

Examples 2 to 19 and Comparative Examples 1 to 4

The procedure of Example 1 was repeated except that a basic constitution of each plugged honeycomb structure was changed as shown in Table 1 and a constitution of each intersection portion was changed as shown in Table 2 and Table 3, to prepare plugged honeycomb structures. The plugged honeycomb structure of Example 18 had a cell arrangement in which a cell shape was a substantially hexagonal shape as shown in FIG. 16. The plugged honeycomb structure of Example 19 had a cell arrangement in which a cell shape was a substantially quadrangular shape as shown in FIG. 14.

As to the plugged honeycomb structures of Examples 2 to 19 and Comparative Examples 1 to 4, evaluations of "trapping efficiency deterioration at a crack generation time", "a pressure loss" and "an isostatic strength" were carried out by methods similar to those of Example 1. Furthermore, "a general evaluation" was carried out on the basis of each evaluation result. Table 4 shows the evaluation results of the respective evaluations.

(Result)

In the plugged honeycomb structures of Examples 1 to 19, the trapping efficiency deterioration at the crack generation time was small. Furthermore, in the plugged honeycomb structures of Examples 1 to 19, the evaluations of the pressure loss and isostatic strength were also evaluations of C or more, and each plugged honeycomb structure was suitably usable as a trapping filter. On the other hand, in the plugged honeycomb structures of Comparative Examples 1 and 2, the trapping efficiency deterioration at the crack generation time was large, and when cracks were generated in intersection portions, the trapping efficiency noticeably deteriorated. Furthermore, in the plugged honeycomb structures of Comparative Examples 3 and 4, the trapping efficiency deterioration at the crack generation time was small, but the pressure loss was large.

A plugged honeycomb structure of the present invention is utilizable as a trapping filter to remove particulates and the like included in an exhaust gas emitted from a direct injection type gasoline engine, a diesel engine or the like.

DESCRIPTION OF REFERENCE NUMERALS

1: partition wall, 1a: first partition wall, 1b: second partition wall, 2: cell, 2a: inflow cell, 2b: outflow cell, 3: plugging portion, 4: intersection portion, 4a: first intersection portion, 4aa: first specific intersection portion, 4ab: second intersection portion, 4aba: second specific intersection portion, 4c: non-first intersection portion, 4ca: non-first specific intersection portion, 5: circumferential wall, 7a, 7b, 7c, 7d and 7e: maximum inscribed circle, 9: honeycomb structure body, 11: inflow side end face, 12: outflow side end face, 100: plugged honeycomb structure, D0(a), D1(a), D2(b), D1(c) and D2(d): diameter (the diameter of the maximum inscribed circle), L0(a): shortest distance (the shortest distance between the inflow cells in the non-first intersection portion), and L1(a), L2(b), L1(c) and L2(d): shortest distance (the shortest distance between the inflow cell and the outflow cell in the first intersection portion).

What is claimed is:

1. A plugged honeycomb structure comprising: a honeycomb structure body having porous partition walls defining a plurality of cells which extend from an inflow side end face to an outflow side end face and become through channels for fluid; and plugging portions arranged in open ends of the respective cells in the inflow side end face or the outflow side end face, wherein the plurality of cells include inflow cells in which the plugging portions are arranged at the open ends of the cells in the outflow side end face, and outflow cells in which the plugging portions are arranged at the open ends of the cells in the inflow side end face, a partition wall defining an inflow cell and an outflow cell is classified as a first partition wall, a partition wall defining inflow cells or outflow cells from each other is classified as a second partition wall, in a cross section of the honeycomb structure body which is perpendicular to the extending direction of the cells, an intersection portion in which at least one first partition wall intersects at least one second partition wall is classified as a first intersection portion and an intersection portion in which the first partition walls or the second partition walls intersect each other is classified as a non-first intersection portion, among first intersection portions, there is specified, as a first specific intersection portion, the first intersection portion in which a diameter D1 of a maximum inscribed circle including a part of the first intersection portion and coming in contact with the inflow cell and the outflow cell in a portion (i) where three partition walls intersect is 1.15 times or more and 1.80 times or less as much as a shortest distance L1 between the inflow cell and the outflow cell in the first intersection portion, or (ii) where four partition walls intersect is 1.50 times or more and 2.10 times or less as much as the shortest distance L1 between the inflow cell and the outflow cell in the first intersection portion, among all the first intersection portions of the honeycomb structure body, 30% or more are first specific intersection portions, among the non-first intersection portions, there is specified, as a non-first specific intersection portion, a non-first intersection portion in which a diameter D0 of a maximum inscribed circle including a part of the non-first intersection portion and coming in contact with the inflow cells or the outflow cells in a portion (i) where three partition walls intersect is smaller than 1.20 times as much as a shortest distance L0 between the inflow cells or the outflow cells in the non-first intersection portion, or (ii) where four partition walls intersect is smaller than 1.55 times as much as the shortest distance L0 between the inflow cells or the outflow cells in the non-first intersection portion, and among all the non-first intersection portions of the honeycomb structure body, 30% or more are non-first specific intersection portions.

2. The plugged honeycomb structure according to claim 1, wherein among all the first intersection portions of the honeycomb structure body, 50% or more are first specific intersection portions.

3. The plugged honeycomb structure according to claim 2,
wherein among the first intersection portions, the intersection portion in which the first partition wall intersects the second partition wall at an angle of 90°±25° is classified as a second intersection portion, and among the second intersection portions, there is specified, as a second specific intersection portion, the second intersection portion in which a diameter D2 of a maximum inscribed circle including a part of the second intersection portion and coming in contact with the inflow cell and the outflow cell is 1.15 times or more and 1.80 times or less as much as a shortest distance L2 between the inflow cell and the outflow cell in the second intersection portion, and among all the first intersection portions of the honeycomb structure body, the first intersection portions at a number percentage of 30% or more are the second specific intersection portions.

4. The plugged honeycomb structure according to claim 3,
wherein all the second intersection portions of the honeycomb structure body are the second specific intersection portions.

5. The plugged honeycomb structure according to claim 4,
wherein among all the first intersection portions of the honeycomb structure body, the first intersection portions other than the second intersection portions are not the first specific intersection portions.

6. The plugged honeycomb structure according to claim 2,
wherein all the first intersection portions of the honeycomb structure body are the first specific intersection portions.

7. The plugged honeycomb structure according to claim 1,
wherein all the non-first intersection portions of the honeycomb structure body are the non-first specific intersection portions.

8. The plugged honeycomb structure according to claim 1,
wherein the percentage of the number of the first intersection portions to the total number of the first intersection portions and the non-first intersection portions of the honeycomb structure body is from 20 to 98%.

9. The plugged honeycomb structure according to claim 1,
wherein a thickness of the partition walls is from 70 to 510 μm.

10. The plugged honeycomb structure according to claim 1,
wherein the partition walls are made of a material including at least one selected from the group consisting of cordierite, mullite, alumina, spinel, silicon carbide, silicon nitride, and aluminum titanate.

11. The plugged honeycomb structure according to claim 1,
wherein in the cross section of the honeycomb structure body which is perpendicular to the cell extending direction, a shape of at least one of the inflow cells is a pentangular shape or a hexagonal shape in which at least one corner is formed into a curve shape or at least one corner is linearly chamfered.

12. The plugged honeycomb structure according to claim 1,
wherein in the cross section perpendicular to the cell extending direction of the honeycomb structure body, a shape of at least one of the outflow cells is a quadrangular shape in which at least one corner is formed into a curve shape or at least one corner is linearly chamfered.

* * * * *